US012774157B2

(12) United States Patent
Ramankutty et al.

(10) Patent No.: US 12,774,157 B2

(45) Date of Patent: Oct. 27, 2026

(54) AUTOMATED STORAGE AND RETRIEVAL SYSTEM WITH MULTI-DIRECTIONAL VEHICLES

(71) Applicant: Swisslog Logistics, Inc., Newport News, VA (US)

(72) Inventors: Mohan Ramankutty, Livermore, CA (US); Zachary Shields, Mission Viejo, CA (US); Bryce Lee Harmon, Ripon, CA (US); Don Chittaphong, Tracy, CA (US)

(73) Assignee: Swisslog Logistics, Inc., Newport News, VA (US)

(*) Notice: Subject to any disclaimer, the term of this patent is extended or adjusted under 35 U.S.C. 154(b) by 270 days.

(21) Appl. No.: 18/712,452

(22) PCT Filed: Nov. 17, 2022

(86) PCT No.: PCT/US2022/050217

§ 371 (c)(1),
(2) Date: May 22, 2024

(87) PCT Pub. No.: WO2023/096812

PCT Pub. Date: Jun. 1, 2023

(65) Prior Publication Data

US 2024/0425280 A1 Dec. 26, 2024

Related U.S. Application Data

(60) Provisional application No. 63/282,303, filed on Nov. 23, 2021.

(51) Int. Cl.

| | |
|---|---|
| ***B65G 1/04*** | (2006.01) |
| ***B65G 1/12*** | (2006.01) |

(Continued)

(52) U.S. Cl.

CPC ......... *B65G 1/0414* (2013.01); *B65G 1/0471* (2013.01); *B65G 1/0478* (2013.01);

(Continued)

(58) Field of Classification Search

CPC .. B65G 1/0414; B65G 1/0471; B65G 1/0478; B65G 1/0485; B65G 1/0492; B65G 1/12; B65G 1/1375; B65G 1/02; G06Q 10/087

See application file for complete search history.

(56) References Cited

U.S. PATENT DOCUMENTS

| | | | | |
|---|---|---|---|---|
| 3,800,963 A | 4/1974 | Holland | | |
| 7,101,139 B1 * | 9/2006 | Benedict | B66B 9/00 | 180/7.1 |

(Continued)

FOREIGN PATENT DOCUMENTS

| | | | |
|---|---|---|---|
| CN | 109748022 A | 5/2019 |
| DE | 2843201 A1 | 4/1980 |

(Continued)

OTHER PUBLICATIONS

European Office Action dated Feb. 21, 2025 for European Patent Application No. 21827753.1.

(Continued)

*Primary Examiner* — Thomas Randazzo

(74) *Attorney, Agent, or Firm* — Bachman & LaPointe, P.C.

(57) ABSTRACT

A storage system (20; 300) for storing loads (32) held by carriers (30; 330) has a plurality of uprights (46; 346) and a plurality of carrier supports (66; 366) mounted to the uprights. A plurality of flooring levels, one above another, are supported by the plurality of uprights and form a first bank (552A) and a second bank (552B) with a divide (550)

(Continued)

between. A plurality of bridges (570) have deployed conditions spanning the divide and stowed conditions not spanning the divide.

21 Claims, 30 Drawing Sheets

(51) Int. Cl.
*B65G 1/137* (2006.01)
*G06Q 10/087* (2023.01)

(52) U.S. Cl.
CPC ......... *B65G 1/0485* (2013.01); *B65G 1/0492* (2013.01); *B65G 1/12* (2013.01); *B65G 1/1375* (2013.01); *G06Q 10/087* (2013.01)

(56) References Cited

U.S. PATENT DOCUMENTS

| | | | | |
|---|---|---|---|---|
| 7,402,018 | B2 | 7/2008 | Mountz et al. | |
| 9,020,632 | B2 * | 4/2015 | Naylor | B65G 1/0492 414/277 |
| 11,008,166 | B2 * | 5/2021 | Gravelle | B65G 1/04 |
| 2014/0086714 | A1 * | 3/2014 | Malik | B65G 1/0492 414/273 |
| 2014/0277693 | A1 | 9/2014 | Naylor | |
| 2017/0313514 | A1 * | 11/2017 | Lert, Jr. | B65G 1/0492 |
| 2018/0148259 | A1 * | 5/2018 | Gravelle | B65G 1/04 |
| 2019/0016573 | A1 | 1/2019 | D'Andrea | |
| 2019/0270591 | A1 * | 9/2019 | Lert, Jr. | B65G 1/0435 |
| 2020/0231384 | A1 * | 7/2020 | Lisso | B65G 1/0492 |
| 2021/0261331 | A1 * | 8/2021 | Otto | B65G 1/0492 |

FOREIGN PATENT DOCUMENTS

| | | | |
|---|---|---|---|
| DE | 102007060730 | B4 | 5/2009 |
| EP | 1710175 | A2 | 10/2006 |
| EP | 3088245 | B1 | 11/2016 |
| WO | 2016/172793 | A1 | 11/2016 |
| WO | 2017/197121 | A1 | 11/2017 |
| WO | 2019/232613 | A1 | 12/2019 |
| WO | 2022/109452 | A2 | 5/2022 |

OTHER PUBLICATIONS

International Search Report and Written Opinion dated Sep. 30, 2022 for PCT/US2021/060498.
"Making Autostore Work for You", Jul. 29, 2019, eBook, Swisslog AG, Buchs, Switzerland.
"CarryPick: Flexible and Modular: The New Approach to Storing and Picking a Large Variety of Items", factsheet, Feb. 21, 2018, Swisslog AG, Buchs, Switzerland.
"CycloneCarrier: Fast and Reliable—Efficient Storage, Order and Picking Consolidation", factsheet, Jan. 24, 2020, Swisslog AG, Buchs, Switzerland.
"Powerstore: Flexible and Sustainable: Optimal Utilization of Pallet Storage Space", Jan. 27, 2020, Swisslog AG, Buchs, Switzerland.
"Dematic Multishuttle® 2—An In-depth and Independent Review from a Supply Chain Consultant", white paper, Jan. 2, 2017, MWPVL International, Inc., Côte Saint-Luc, Quebec, Canada.
International Search Report and Written Opinion dated Apr. 5, 2023 for PCT/US2022/050217.

* cited by examiner

AUTOMATED STORAGE AND RETRIEVAL SYSTEM WITH MULTI-DIRECTIONAL VEHICLES

CROSS-REFERENCE TO RELATED APPLICATION

Benefit is claimed of U.S. Patent Application No. 63/282,303, filed Nov. 23, 2021, and entitled "Automated Storage and Retrieval System with Multi-Directional Vehicles", the disclosure of which is incorporated by reference herein in its entirety as if set forth at length.

BACKGROUND

The disclosure relates to automated storage and retrieval systems (ASRS). More particularly, the disclosure relates to ASRS using multi-directional autonomous guided vehicles (AGV). Various automated storage and retrieval systems have existed or been proposed. In one group of such systems, racks define aisles and rows with automated carts moving down respective aisle and row tracks to transfer loads to designated storage areas. Various means may be provided for transferring the loads from the carts to the racks. See, generally: International Publication No. WO2015/112665A1, published Jul. 30, 2015, entitled "Apparatus for Positioning an Automated Lifting Storage Cart and Related Methods"; International Publication No. WO2015/134529A1, published Sep. 11, 2015, entitled "Automated Lifting Storage Cart"; International Publication No. WO2016/094039A1, published Jun. 16, 2016, entitled "Structure for Automated Pallet Storage and Retrieval"; and U.S. Pat. No. 10,207,867B2, issued Feb. 19, 2019, and entitled "Automated Pallet Storage and Retrieval System".

Additionally, among various forms of autonomous guided vehicles (AGV) are two-wheel, differential-drive, AGV. An example AGV is the KMP600™ AGV of KUKA AG and KUKA Robotics Corporation, Shelby Township, Michigan.

SUMMARY

One aspect of the disclosure involves a storage system for storing loads comprising: a plurality of carriers, for holding respective loads; a plurality of uprights; a plurality of flooring levels, one above another, supported by the plurality of uprights; a plurality of carrier supports; at least one wheeled automated vehicle, for carrying said carriers along the flooring levels; and means for moving the at least one wheeled automated vehicle between the flooring levels. Each vehicle comprises: a chassis; a pair of wheels rotatably mounted to the chassis, at least one motor for driving the pair of wheels; and a lifting surface for supporting a supported one of the carriers and shiftable between a lowered condition and a raised condition.

In a further embodiment of any of the foregoing embodiments, additionally and/or alternatively, the means for moving comprises: a pair of vertically-extending toothed racks; and a motorized platform having a pair of pinions engaged to the toothed racks and driven by a motor for vertical movement between the flooring levels.

In a further embodiment of any of the foregoing embodiments, additionally and/or alternatively, the plurality of uprights are distributed as a rectangular grid.

In a further embodiment of any of the foregoing embodiments, additionally and/or alternatively: the plurality of uprights comprise at least 20 uprights distributed as a rectangular grid, the rectangular grid having at least 4 rows of uprights in a first direction and at least 5 rows of uprights in a second direction orthogonal to the first direction; and/or the rectangular grid has an on-center spacing in the first direction that is 80% to 120% of an on-center spacing in the second direction.

In a further embodiment of any of the foregoing embodiments, additionally and/or alternatively, the plurality of uprights comprise metallic extrusions, and wherein the carrier supports laterally protrude from the metallic extrusions so that the carrier supports of four of the uprights may support four corners of a stored one of the carriers.

In a further embodiment of any of the foregoing embodiments, additionally and/or alternatively, the plurality of carriers is a plurality of totes, each tote having: a base; opposite first and second sides extending from the base; and opposite second and third sides extending from the base. Each tote has outwardly protruding features dimensioned to rest atop the carrier supports in a stored condition.

In a further embodiment of any of the foregoing embodiments, additionally and/or alternatively, each flooring level comprises an array of floor segments, each segment being attached to four adjacent ones of the uprights.

In a further embodiment of any of the foregoing embodiments, additionally and/or alternatively, the at least one wheeled automated vehicle is a two-wheel, differential drive, vehicle.

In a further embodiment of any of the foregoing embodiments, additionally and/or alternatively, the at least one wheeled automated vehicle has omnidirectional ball transfer units along an underside for support.

In a further embodiment of any of the foregoing embodiments, additionally and/or alternatively, the storage system further comprises a control system configured to: control the at least one wheeled automated vehicle and the means for moving to selectively store and retrieve the carriers.

In a further embodiment of any of the foregoing embodiments, additionally and/or alternatively, the control system includes an inventory of the carriers and the loads.

In a further embodiment of any of the foregoing embodiments, additionally and/or alternatively, the storage system further comprises a transfer deck surrounding at least one third of a perimeter of an intermediate level of the plurality of flooring levels so that the at least one wheeled automated vehicle may drive directly from said intermediate level to said transfer deck.

In a further embodiment of any of the foregoing embodiments, additionally and/or alternatively, a method for using the storage system comprises: a wheeled automated vehicle of said plurality of wheeled automated vehicles driving to a position below a stored carrier which stored carrier carries a load; the wheeled automated vehicle raising its lifting surface from the lowered condition to contact an underside of the stored carrier and lift the stored carrier to the raised condition; and with the stored carrier in the raised condition moving the stored carrier.

In a further embodiment of any of the foregoing embodiments, additionally and/or alternatively, the method further comprises: the wheeled automated vehicle, while carrying the carrier carrying the load, driving to the means for moving; and the means for moving the wheeled automated vehicle, carrying the carrier carrying the load.

In a further embodiment of any of the foregoing embodiments, additionally and/or alternatively, the method further comprises: with the wheeled automated vehicle or another wheeled automated vehicle of the at least one wheeled automated vehicle, moving another of the carriers from another of the storage locations to unblock a path of movement of the stored carrier.

A further aspect of the disclosure involves a method for operating a storage system for storage and retrieval of loads on carriers. The storage system comprises: a plurality of levels having respective floors; at each level, an array of storage locations; and at least one wheeled automated vehicle. The method comprises: the wheeled automated vehicle driving to a position below a stored carrier which stored carrier carries a load; the wheeled automated vehicle raising a lifting surface from a lowered position to contact an underside of the stored carrier and lift the stored carrier to a raised position; and with the stored carrier in the raised position moving the stored carrier.

In a further embodiment of any of the foregoing embodiments, additionally and/or alternatively, the method further comprises: the wheeled automated vehicle, while carrying the carrier carrying the load, driving onto an elevator platform; and the elevator platform moving vertically to vertically move the wheeled automated vehicle, carrying the carrier carrying the load.

In a further embodiment of any of the foregoing embodiments, additionally and/or alternatively: each of the storage locations has a plurality of support surfaces for supporting a stored carrier; the carriers each have surfaces dimensioned to engage the support surfaces in the stored condition; the lifting of the stored carrier disengages the carrier surfaces from the support surfaces; and/or during the moving, the carrier surfaces pass over the support surfaces of one or more others of said storage locations.

In a further embodiment of any of the foregoing embodiments, additionally and/or alternatively: the carriers have a non-square footprint; the wheeled automated vehicle lifting surface comprises a platform rotatable about a vertical axis relative to a chassis of the wheeled automated vehicle; and during a turn of the chassis, the platform rotates opposite to the chassis to maintain an orientation of the stored carrier in the raised position.

In a further embodiment of any of the foregoing embodiments, additionally and/or alternatively, the method further comprises: with the wheeled automated vehicle or another wheeled automated vehicle of the at least one wheeled automated vehicle, moving another of the carriers from another of the storage locations to unblock a path of movement of the stored carrier.

In a further embodiment of any of the foregoing embodiments, additionally and/or alternatively: the storage system comprises a first bank and a second bank with a divide between; the storage system further comprises a plurality of bridges having deployed conditions spanning the divide and stowed conditions not spanning the divide; and the method comprises the wheeled automated vehicle driving across a deployed bridge.

Another aspect of the disclosure involves a storage system for storing loads held by carriers. The storage system has: a plurality of uprights; a plurality of carrier supports mounted to the uprights; a plurality of flooring levels, one above another, supported by the plurality of uprights and forming a first bank and a second bank with a divide between; and a plurality of bridges having deployed conditions spanning the divide and stowed conditions not spanning the divide.

In a further embodiment of any of the foregoing embodiments, additionally and/or alternatively, the plurality of bridges are distributed in at least one vertical array.

In a further embodiment of any of the foregoing embodiments, additionally and/or alternatively, for at least one said vertical array, the plurality of bridges are formed as hinged bridge platforms with a linkage synchronizing movement between the deployed conditions and stowed conditions.

In a further embodiment of any of the foregoing embodiments, additionally and/or alternatively, the linkage comprises a pair of vertical posts pivotally connected to its associated bridge platforms.

In a further embodiment of any of the foregoing embodiments, additionally and/or alternatively, the pair of posts have lower ends unsupported in the deployed condition.

In a further embodiment of any of the foregoing embodiments, additionally and/or alternatively, the storage system further has a plurality of clips for detentedly holding associated bridges in the stowed condition.

In a further embodiment of any of the foregoing embodiments, additionally and/or alternatively, the at least one vertical array comprises at least one pair of vertical arrays of opposed pluralities of bridges for combining to span the divide in their deployed conditions.

In a further embodiment of any of the foregoing embodiments, additionally and/or alternatively, the storage system further comprises: at least one wheeled automated vehicle, for carrying said carriers along the flooring levels and each comprising: a chassis; a pair of wheels rotatably mounted to the chassis; at least one motor for driving the pair of wheels; and a lifting surface for supporting a supported one of the carriers and shiftable between a lowered condition and a raised condition; and means for moving the at least one wheeled automated vehicle between the flooring levels.

In a further embodiment of any of the foregoing embodiments, additionally and/or alternatively, the plurality of uprights are distributed as a rectangular grid.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
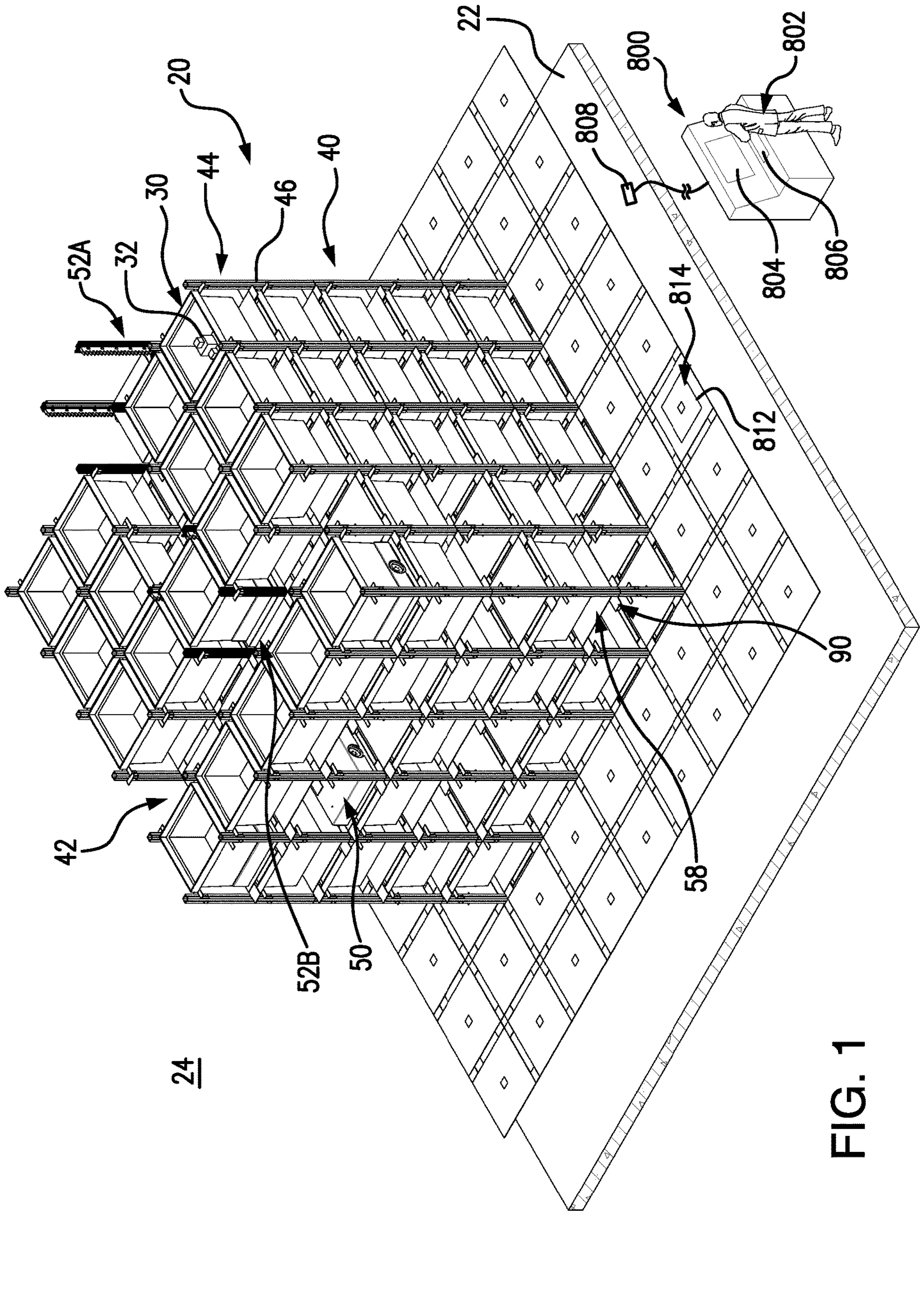
FIG. 1 is a view of an automated storage and retrieval system (ASRS).

FIG. 1 shows an automated storage and retrieval system (ASRS or system) 20 atop a floor surface 22 in the interior 24 of a building/facility such as a warehouse, a retail store (e.g., in a storage area of the store), and the like. The system 20 uses carriers 30 to carry loads of goods (products) 32 (only one loaded carrier shown in FIG. 1). Example carriers are bins or totes (discussed below). Alternative carriers may be pallets (not shown) which, themselves, may carry/support smaller bins/totes.

The system 20 further includes a storage rack system (rack) 40 having a plurality of discrete locations 42 (storage locations) for storing the carriers. As is discussed below, the storage rack system includes a structural frame 44 with a plurality of uprights 46.

Figure 5:
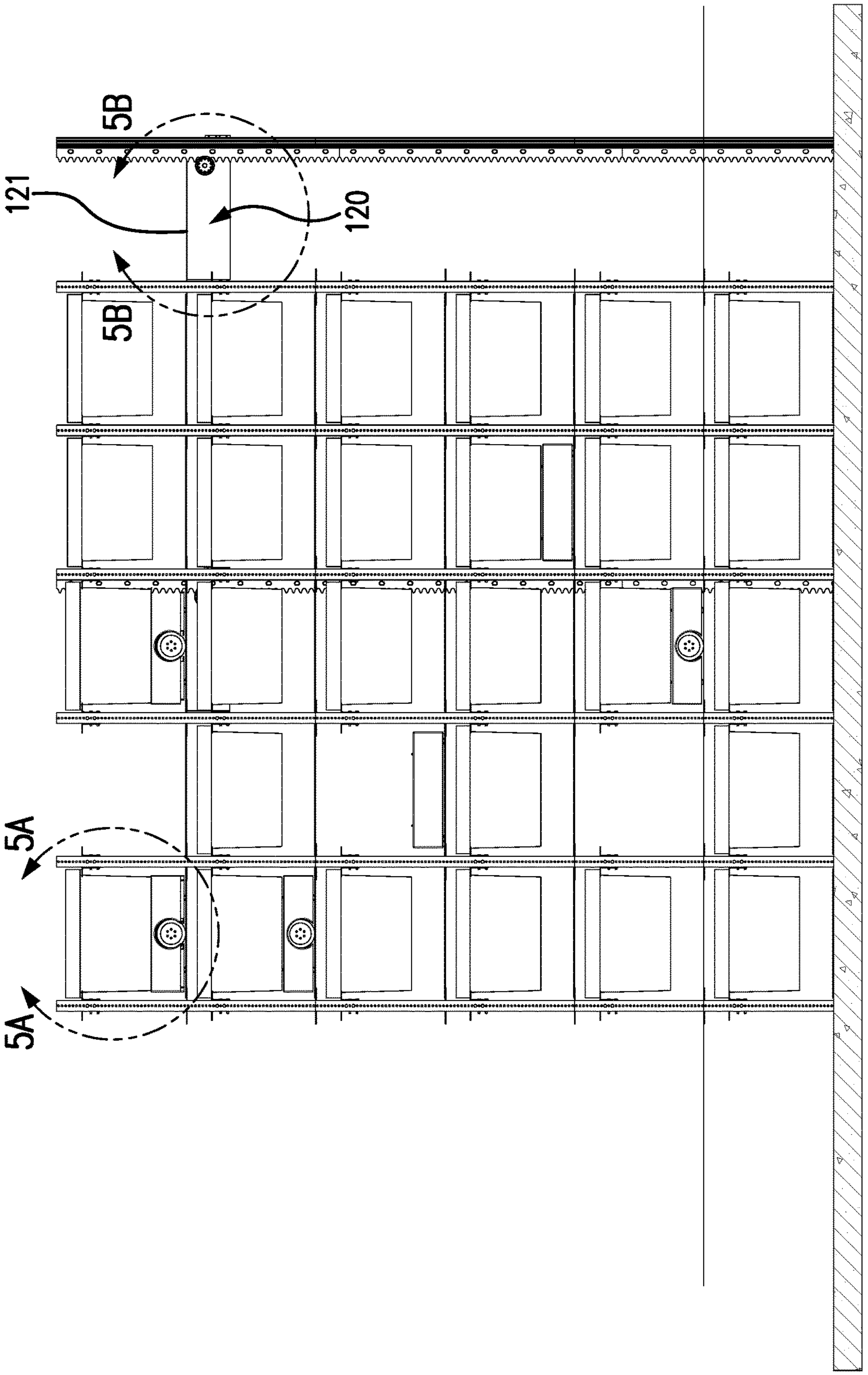
FIG. 5 is a side view of the ASRS.

The example storage locations 42 are arrayed in a multi-level grid (e.g., in a rectangular array) of locations (e.g., with levels 48A, 48B, 48C, 48D, 48E, 48F (FIG. 5) from lowermost to uppermost). The frame uprights 46 are in a similar rectangular array so that frame uprights are located at the corners of each of the storage locations 42.

The identification of a “rectangular” array refers to the on-center pattern of the locations 42 or frame uprights 46 rather than an exterior perimeter or planform or footprint of the storage rack system. In a simple embodiment, the footprint is rectangular. However, to accommodate available space, the footprint may be other than rectangular while still retaining a rectangular array in that centers of adjacent storage locations and centers of adjacent frame uprights form respective rectangles. The storage rack system 40 is a multi-level structure with one level above another and the location 42 arrays of each level being vertically aligned with each other. An example rectangular grid has an on-center spacing in the first direction that is 80% to 120% of an on-center spacing in the second direction. Thus, the example longer dimension is 100% to 125% of the shorter or equal.

As is discussed further below, however, there may be, on one or more levels, gaps in the array wherein a given location in the array lacks certain features for storing carriers. As is discussed further below, such gaps in the array may serve a number of purposes. One purpose is to provide vertical transport paths (hoistways) for the carriers 30. Another purpose is to accommodate environmental structure. For example, at an intermediate level in the system, piping or an HVAC duct (not shown) may need to pass, thereby eliminating potential storage locations.

The carriers 30 are moved within a given level 48A-48F atop and by autonomous guided vehicles (AGV) 50. For movement between the levels (i.e., from one level to another), the carriers may be supported atop the AGV which, in turn, is moved via one or more elevator systems 52A, 52B.

Figure 2:
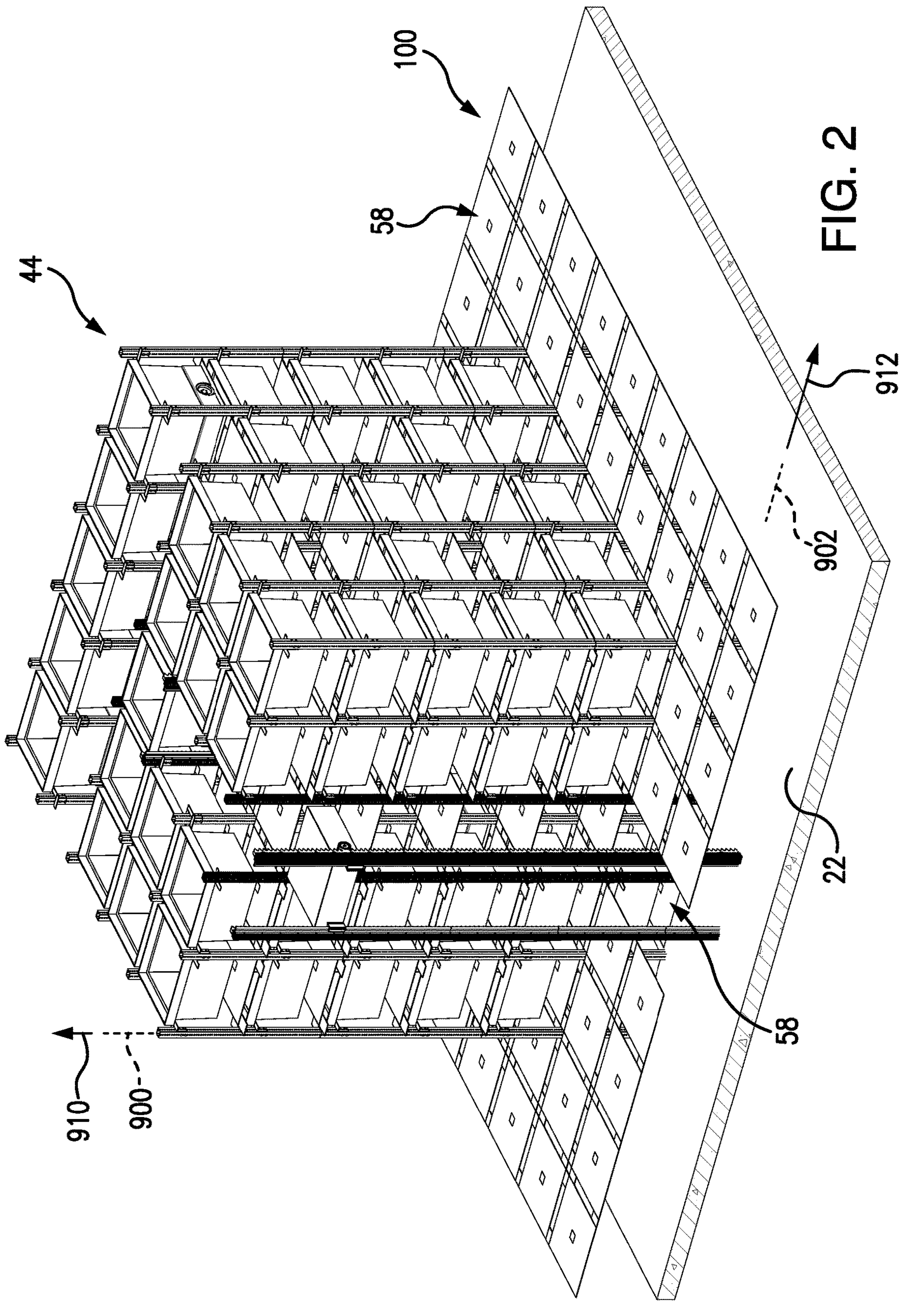
FIG. 2 is a second view of the ASRS.

For purposes of establishing a frame of reference, an upward vertical z direction 910 (FIG. 2) is shown associated with a z-axis 900. Horizontal/lateral x- and y-axes 902 and 904 are defined relative to the two inherent axes of the rectangular array and may have an arbitrary origin in a center of a storage location 42 in the array or in an array frame upright. x and y directions are shown as 912 and 914, respectively. The x-y-z designations are for relative reference only because some ASRS manufacturers designate the y-axis as vertically upward and the x- and z-axes as orthogonal horizontal axes.

Figure 5A:
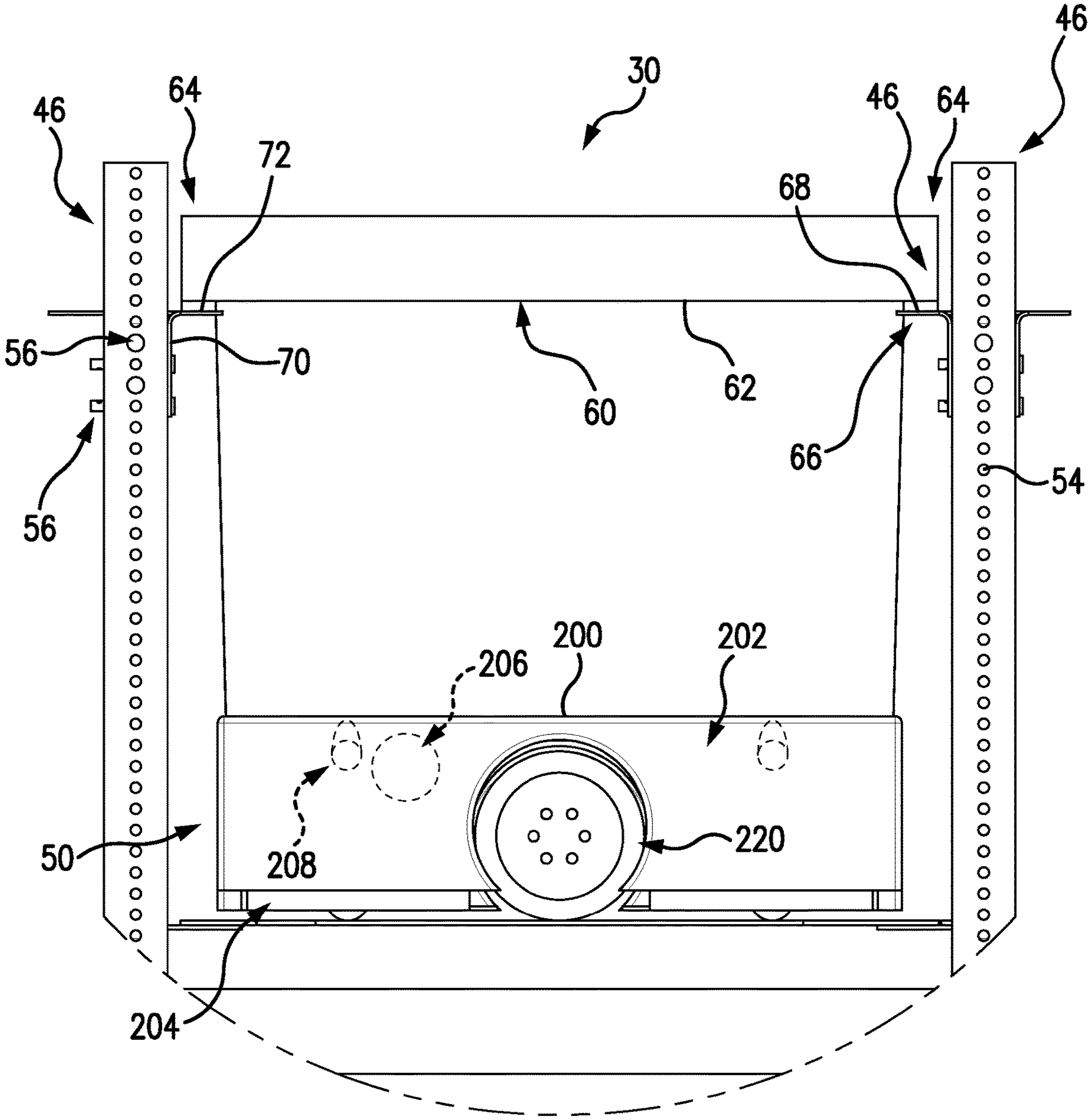
FIG. 5A is an enlarged view of a storage location in the ASRS.
Figure 5B:
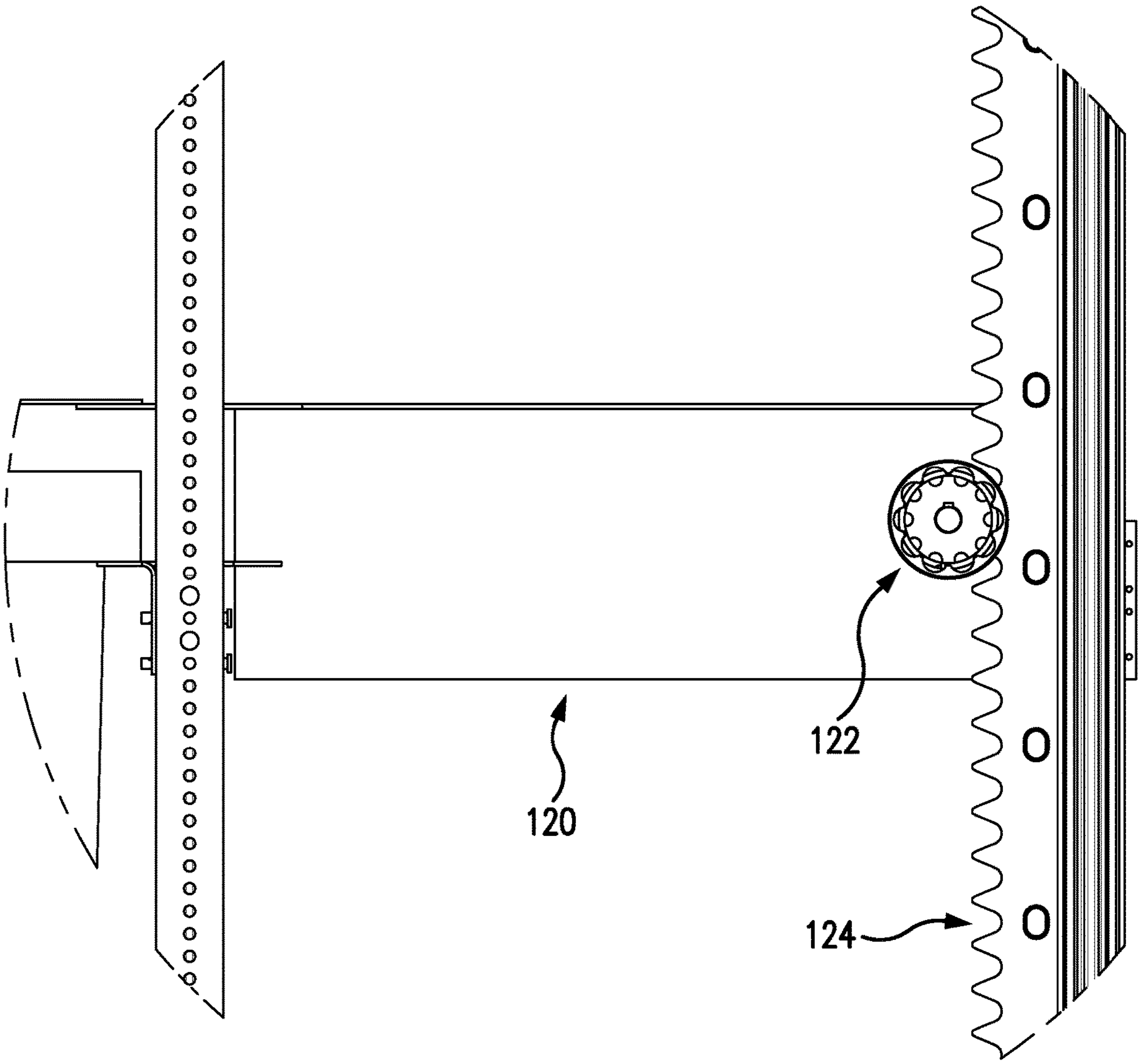
FIG. 5B is an enlarged view of the first elevator platform.

The example carriers are totes 30 having an essentially rectangular footprint (e.g., rectangular (such as square) with rounded corners) and may be formed of a molded plastic/polymer material (e.g., high density polyethylene (HDPE)). Each tote 30 thus has a base (bottom) and a sidewall with four sidewall sections extending upward from the base to a rim in opposite pairs to laterally surround an interior of the tote. The tote 30 may have outwardly protruding features for allowing the tote to be held in a location 42 in the rack. One option for features is an outward step 60 (FIG. 5A) in a single layer of the sidewall. Another is a rim flange (not shown) wherein the sidewall layer extends laterally outward and back downward to form a short outer wall. The outer wall may be connected to a main/inner wall by structural webs.

The underside 62 of the step 60 adjacent the four footprint corners 64 of the tote may contact the upper surface 68 of a carrier support 66 mounted to the adjacent upright 46.

The example uprights 46 are formed as square-section box tubing (e.g., aluminum or steel) with a vertical array of mounting holes 54 on each face. The supports 66 may be attached via the mounting holes (e.g., via mounting fasteners such as detent pins or locking pins, or through-bolts or screws between opposite faces of the upright).

Figure 7:
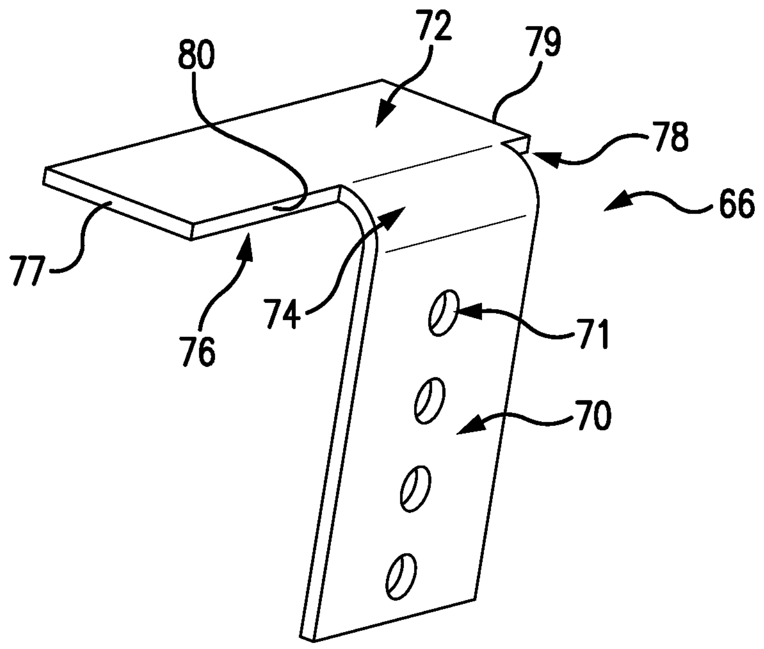
FIG. 7 is a view of carrier support.

The example supports 66 are provided in groups of up to four per upright per level allowing less than four to be used in locations that do not need supports 66 at all corners of the upright. For example, the supports 66 may be formed as bent metal brackets having a vertical mounting portion 70 along the upright. The example mounting portion 70 (FIG. 7) has holes 71 passing the associated mounting fasteners 56 (FIG. 5A) (e.g., ball detent pins (shown) or nutted screws/bolts). The supports 66 may further include a horizontal portion or flange 72 providing the surface 68. The horizontal portion 72 may extend laterally past the adjacent edge of the cross-section of the upright. In this way, when four supports per upright per level are used the flanges 72 may inter-nest circumferentially around the upright 46. In this example, the mounting portion 70 is as wide as or slightly less wide than the upright 46. A bend 74 (FIG. 7) laterally offsets/spaces the flange 72 away from the upright. The flange 72 includes a first end portion 76 extending to a terminal end 77 spaced significantly past the adjacent edge of the mounting portion 70. A second portion 78 extending to a terminal end 79 protrudes only slightly relative to its adjacent edge of the mounting portion 70. In the example nesting, the end 79 of one end portion 78 contacts or closely faces an inboard edge 80 of the first portion 76 along the adjacent support 66. Thus, the protrusion of the second portion 78 is effective to compensate for the outward spacing due to the bend 74.

Alternative support configurations may be used including: (1) a two-piece system where each support piece occupied two of four sides of the upright; or (2) a single sleeve (not shown) encircling an upright and replacing the up-to-four supports 66. The sleeve may have an outwardly projecting flange providing the support surface. The flange may be cut away adjacent any location in the array that is not a storage location (e.g., an elevator location) within the footprint of the array.

Each of the levels 48A-48F has an associated flooring level providing a surface along which the AGV may navigate.

Figure 8:
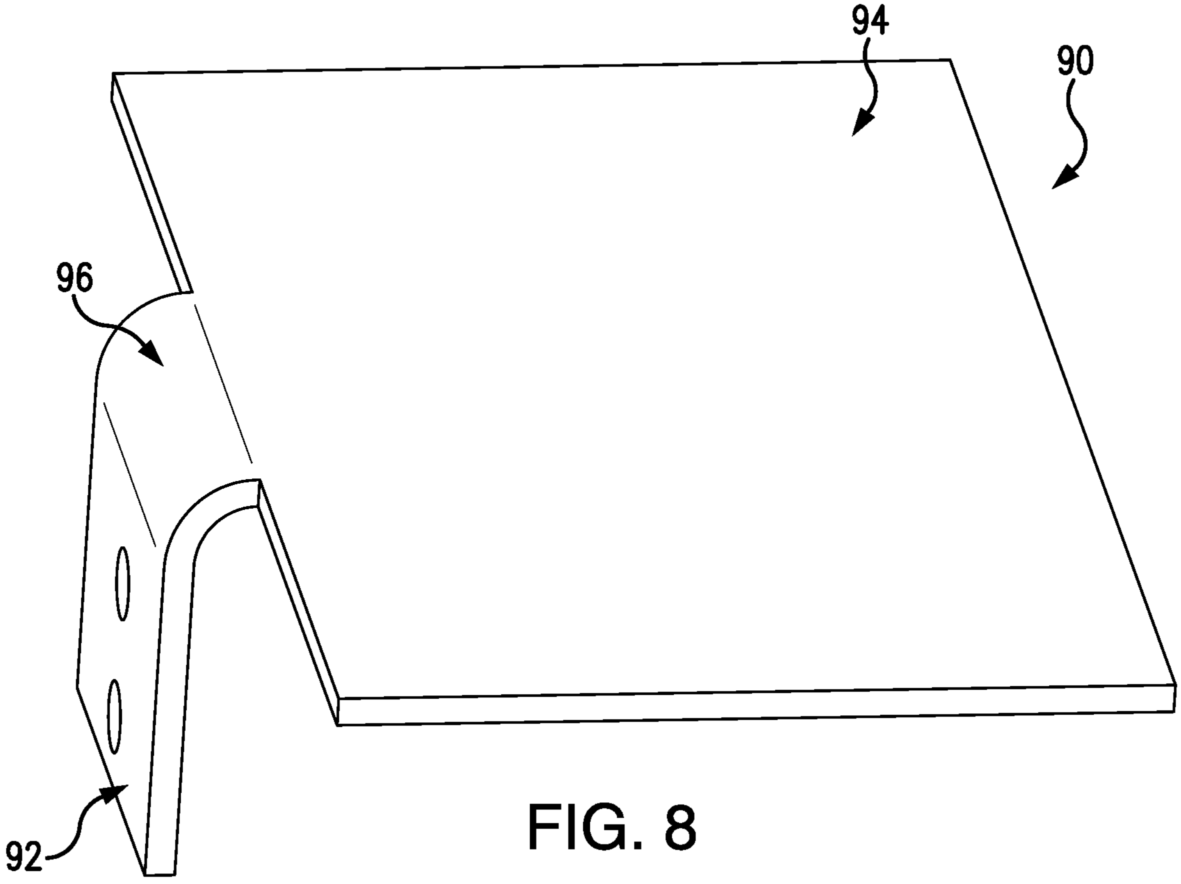
FIG. 8 is a view of a floor plate support.

For a plurality of the levels 48A-48F, the associated flooring level may be formed by floor tiles or plates 58 (FIG. 1) supported by the structural frame 44. Example tiles 58 are metal (e.g., steel or aluminum plates, optionally, structurally reinforced along their undersides). The tiles may have any of numerous possible mounting arrangements with the frame. In a simple example, the tiles are supported by supports 90 which may similarly mount to the uprights 46 as do the carrier supports 66. FIG. 8 shows an example support 90 similarly formed of bent metal and similarly having a vertical mounting portion 92 joined to a horizontal portion 94 by a bend 96. With the example supports 90, the basic support configuration lacks the asymmetry of the support 66. The horizontal portion 94 is large enough to support two adjacent tiles on either side of the vertical mounting portion. With this example, only two supports per level per upright are used for most locations in the array (certain edge locations needing only one). For internal locations adjacent elevators, the portion of the horizontal portion 94 that would otherwise block the elevator path (hoistway) may be cutaway. Or pre-formed supports lacking an interfering area of the horizontal portion 94 may be used. Again, the supports 90 may be through-fastened in similar fashion to the supports 66. As with the supports 66, the tiles may be secured to the supports 90 via means such as fasteners, welding or brazing, or non-fastener mechanical interfitting.

Figure 6:
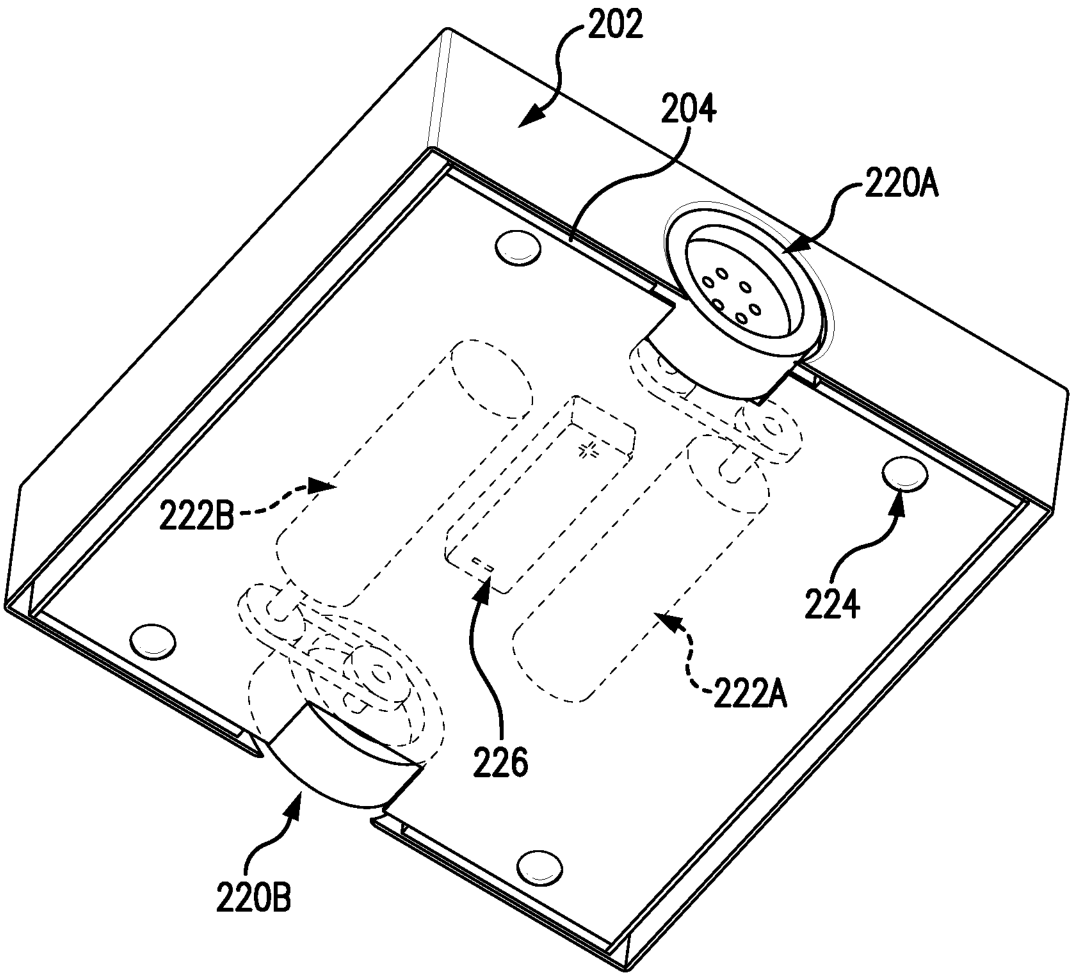
FIG. 6 is an oblique bottom view of an autonomous guided vehicle (AGV).

The AGV 50 (e.g., battery-powered) has an upper lifting surface 200 (FIG. 5A) (e.g., an upper surface of a cover 202) which may be raised and lowered relative to a chassis 204 via an actuator 206 (e.g., an electric motor (e.g., a servomotor) driving four lifting cams 208 engaging an underside of the cover). For driving, the example AGV is a two-wheel, differential-drive, vehicle with left and right wheels 220A, 220B (FIG. 6) driven by respective electric motors 222A, 222B (e.g., servomotors). The AGV may be supported front and rear by casters, ball transfer units 224, or low friction glides (e.g., respective omnidirectional ball transfer units near each of four corners of the underside of the chassis). An example AGV is the KMP600™ AGV of KUKA AG and KUKA Robotics Corporation, Shelby Township, Michigan. A battery 226 may power the motors, control electronics, sensors, and the like.

Figure 3:
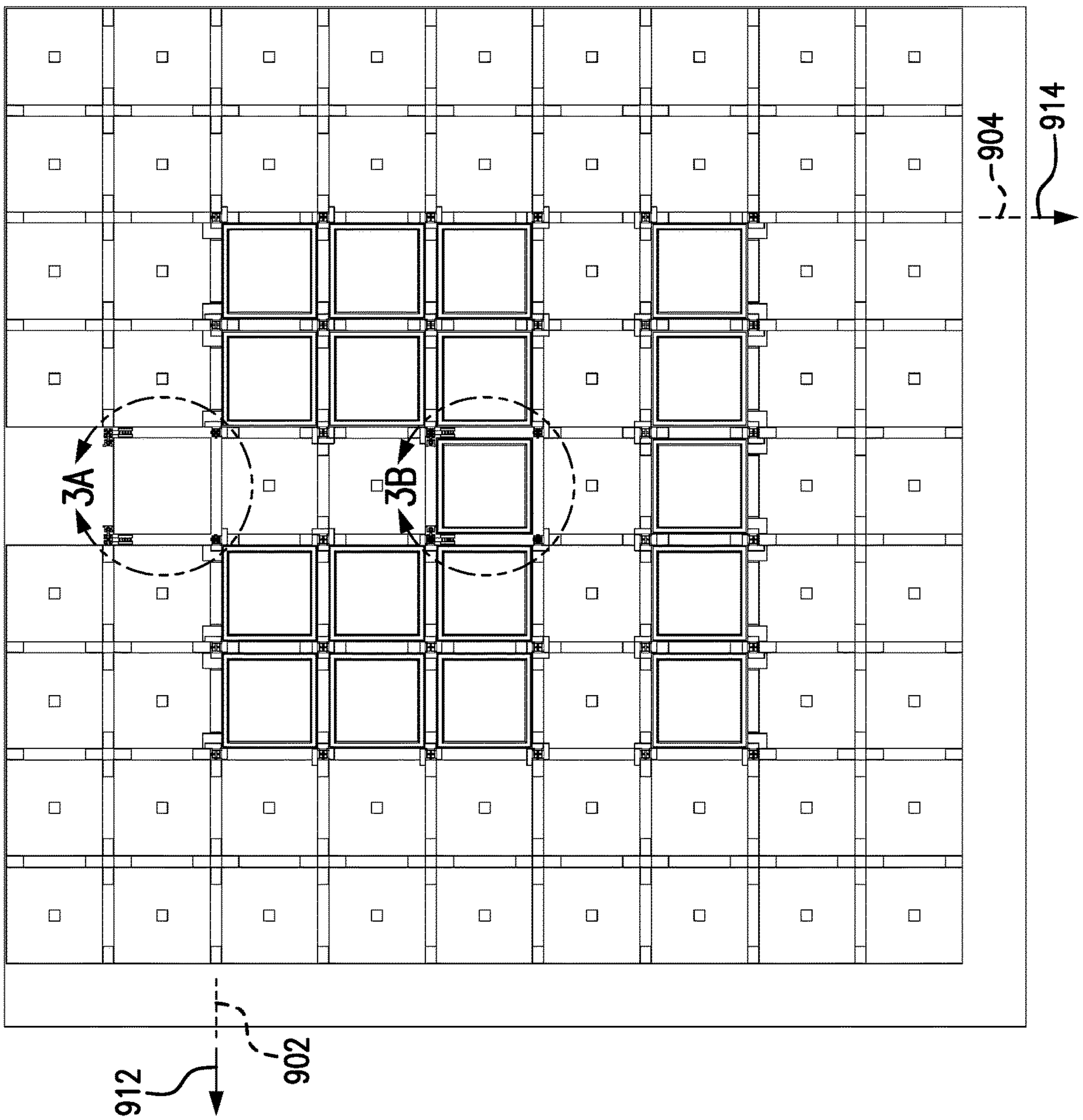
FIG. 3 is a top view of the ASRS.
Figure 3A:
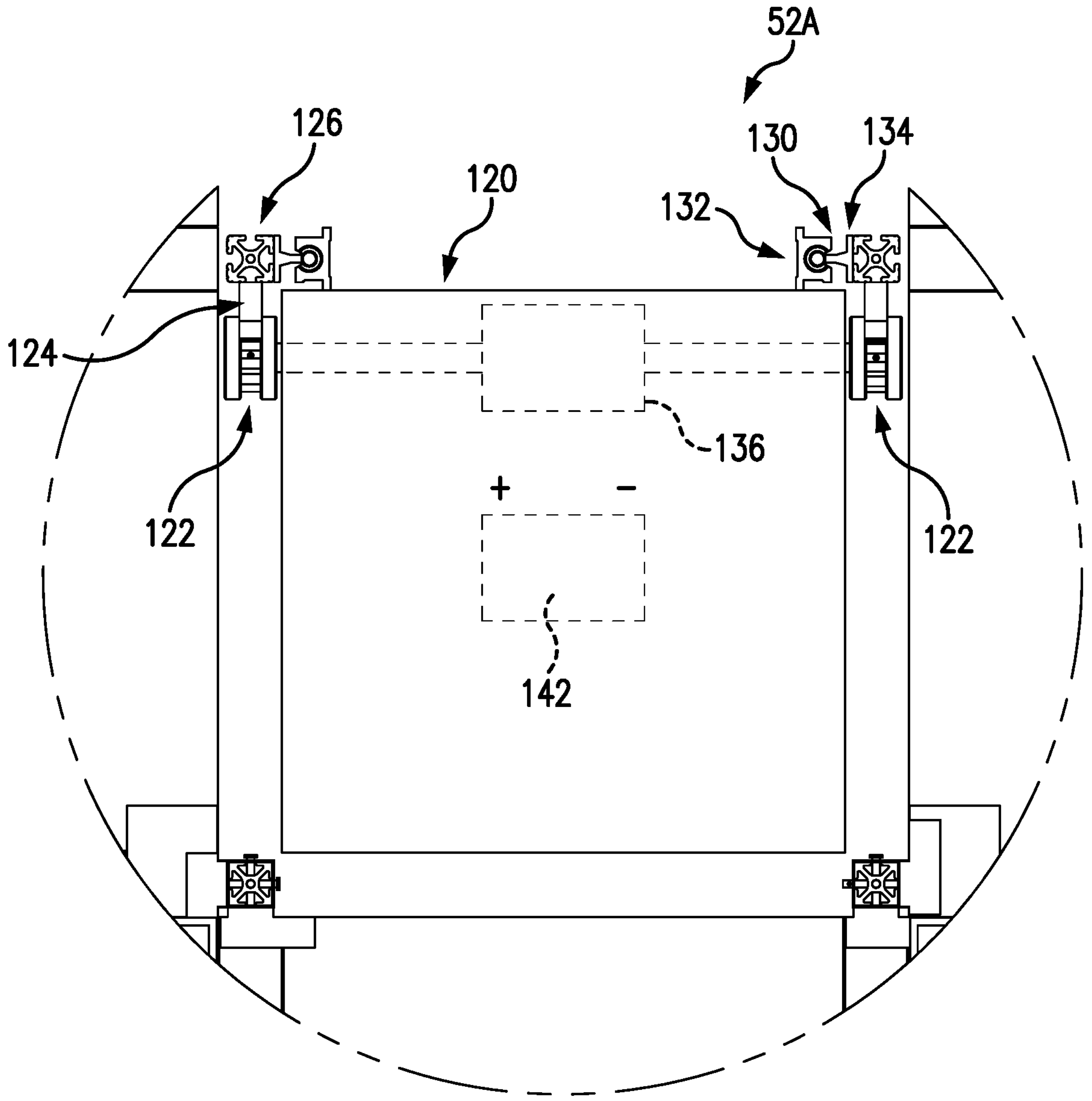
FIG. 3A is a detail view of a first elevator of the ASRS.
Figure 3B:
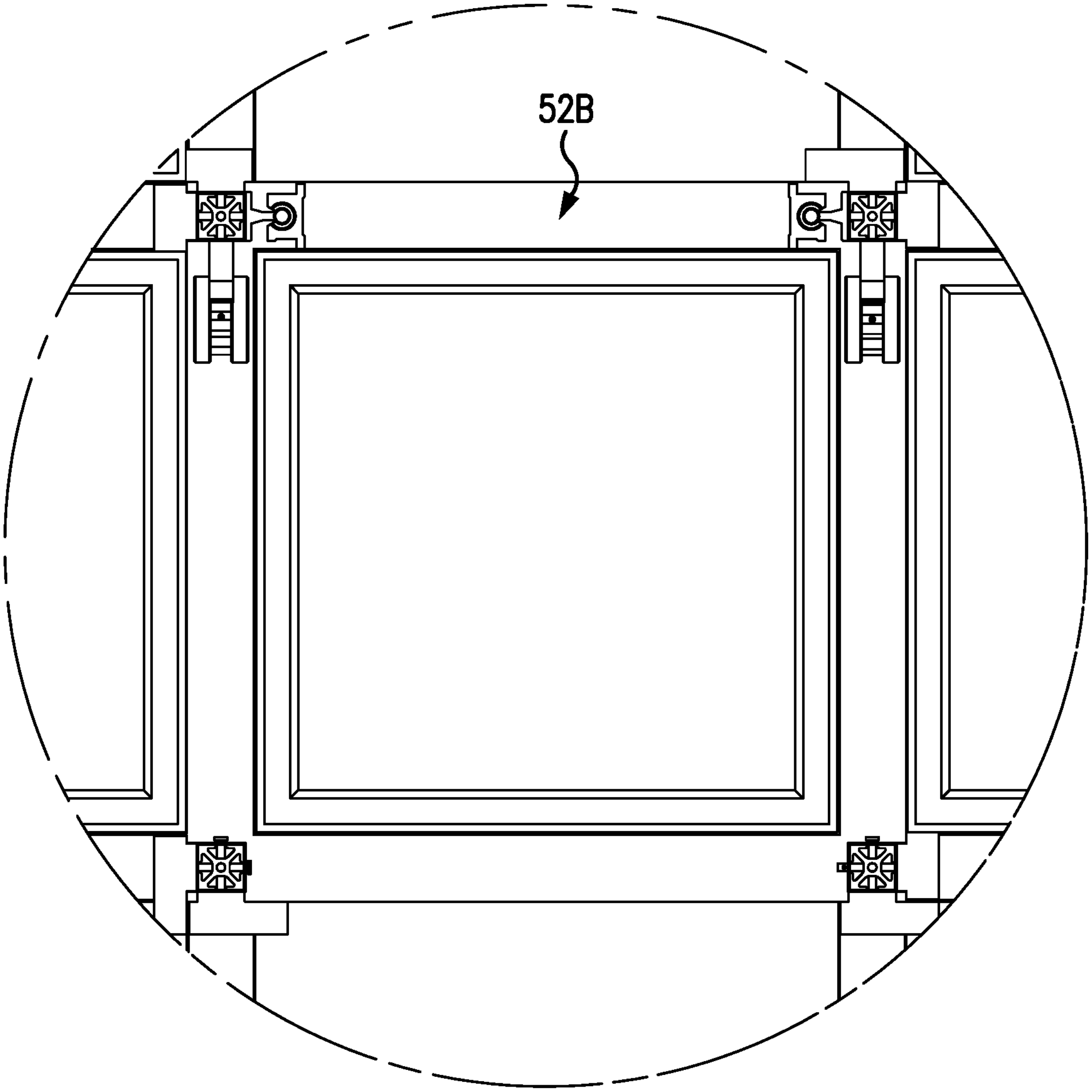
FIG. 3B is a detail view of a second elevator of the ASRS.
Figure 4:
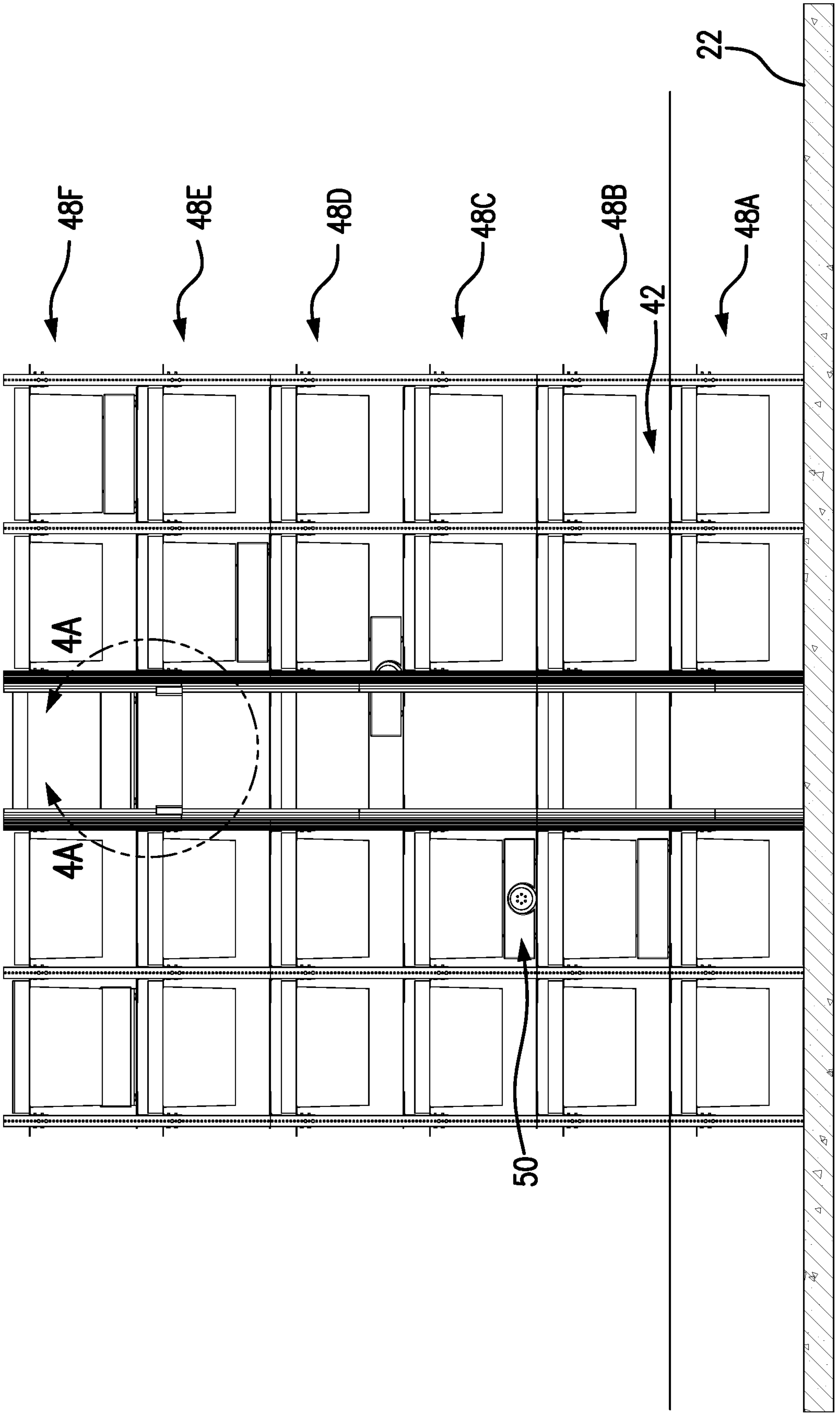
FIG. 4 is a rear view of the ASRS.
Figure 4A:
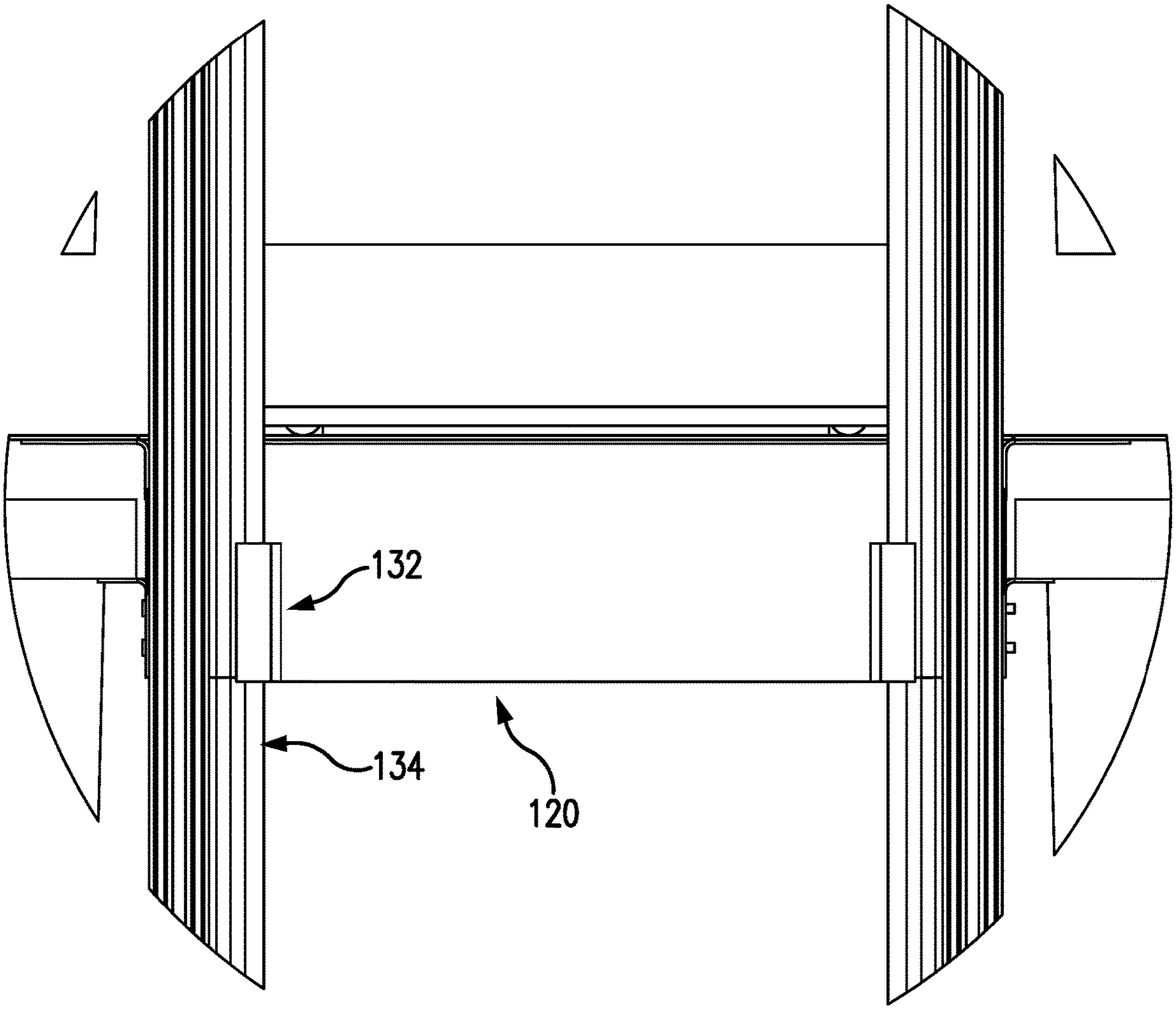
FIG. 4A is an enlarged view of a platform of the first elevator.

Each example elevator 52A, 52B comprises a vertically movable platform 120 (FIG. 5) having an upper surface 121 onto and off of which an AGV may drive itself. The example means for raising and lowering the platform comprises one or more motor-driven roller pinion gears (pinions) 122 (FIG. 3A) (two shown) on the platform, each engaging a corresponding vertically oriented toothed rack 124 (two shown in respective engagement with the pinions). Example toothed racks are mounted to structural uprights 126 (e.g., metal columns such as aluminum extrusions). The structural uprights may extend upward from lower mountings on the facility floor to upper mountings joined to the frame (e.g., above the uppermost level). Example roller pinion gears and racks are made by Nexen Group, Inc. of Vadnais Heights, Minnesota, USA.

An example means for retaining the platform 120 to the toothed racks 124 and maintaining an orientation of the platform comprises one or more linear bearings 130 (two shown, one engaging each structural upright 126). The example linear bearings include a pair of female moieties 132 (e.g., open ball bushing bearing pillow blocks) at the rear of the platform engaging male moieties 134 (e.g., round shaft support rails) along inboard edges of the uprights 126.

An example electric motor 136 may be shared by the pinions (e.g., the pinions commonly mounted on a shaft driven by the motor). The motor may be powered by a battery 142 internal to the platform. In such case, the battery may charge at a specific vertical position (e.g., when parked at a base of the elevator corresponding to the lowest level, electrical contacts (not shown) may provide power to charge the battery). Alternatively, there may be means for transmitting electrical power to the platform motor along the entire vertical range of motion. Example such means include power rails (not shown) integrated with the elevator structural uprights engaging complementary contact shoes (not shown) on the platform.

Although loading and unloading may be to the facility floor, it may be to another level such as an elevated level that is ergonomically advantageous. In the illustrated example, a lowermost flooring level is the facility floor 22 or directly atop it (e.g., tiles 58 (FIG. 2) placed atop the floor). A transfer deck 100 (FIG. 2) is aligned with the next level above so that AGV may drive directly from the next level to the transfer deck. The transfer deck may be at a height whereby human users may comfortably load and unload the carriers from the AGV or loads from the carriers on the AGV. Or it may be at a height convenient for access to destination machinery (robots, etc.). The example transfer deck 100 surrounds the frame 44 and footprint of the locations 42. In the example embodiment, the transfer deck is formed by a two-tile wide band of the tiles 58 continuing the tile array of the second flooring level that provides the storage level 48B. These tiles may be supported by vertical posts (not shown) at the corners or by other more central supports if there is no need for AGV to drive immediately below the transfer deck.

In operation, one or more of the AGV can access a stored load by moving loads as a person would move tiles in a slide puzzle. But there are many variations. In a slide puzzle, there is only one empty cell or location. However, in any given level of the ASRS there may be multiple empty locations and the number of empty locations may vary. For example, in one group of implementations, empty carriers are not stored in the locations 42 but are stored elsewhere (e.g., in a magazine or dispenser or simply a stack (not shown) on the facility floor). By not having empty carriers in locations 42, speed of retrieval may be increased (relative to storing empty carriers in the locations 42). In other variations, even if empty carriers are stored in locations 42, multiple locations 42 per level may be left unoccupied to increase retrieval speed.

The quantity of AGV may be selected in view of the ASRS size and required throughput. There need only be one AGV in a very low throughput environment. There may, however, be more than one AGV with ever-increasing numbers generally being associated with greater throughput at a given ASRS size (e.g., a given number of locations 42). In an example of a higher number of AGV, there may be multiple AGV per level of the ASRS and the AGV may work together to simultaneously move loads. The simultaneous movement of loads may merely be to retrieve a given load (e.g., multiple AGV moving other loads or empty carriers out of the way and the target load simultaneously) or there may be parallel operations retrieving and storing multiple loads (or empty carriers if empty carriers are stored in locations 42) at a given time.

To move a carrier from a location 42 (whether loaded or unloaded), the AGV drives itself to a position centered under the carrier while its lifting surface is in the lowered position and the carrier is supported by the associated features. The AGV then raises the lifting surface to contact the underside of the carrier and continue to the raised position of the lifting surface lifting the carrier to its raised position disengaged from the features. The AGV may then drive itself carrying the carrier. If the AGV passes through empty locations 42, the carrier will pass over (clear of) the features of that location 42.

Similarly, to deposit/deliver a carrier (whether loaded or not) to a location 42, the carrier drives to the location while supporting the carrier in the respective raised positions of the lifting surface and carrier. Again, when passing through empty locations 42, the carrier passes over the features. Upon reaching a desired location (either the ultimate destination or an intermediate destination from which the AGV must temporarily move to other locations to move other carriers out of the way) the AGV lowers its lifting surface to deposit the carrier atop the features of the subject location 42 and then further lowers the lifting surface to its lowered position to disengage and allow the AGV to move without the load.

Figure 10:
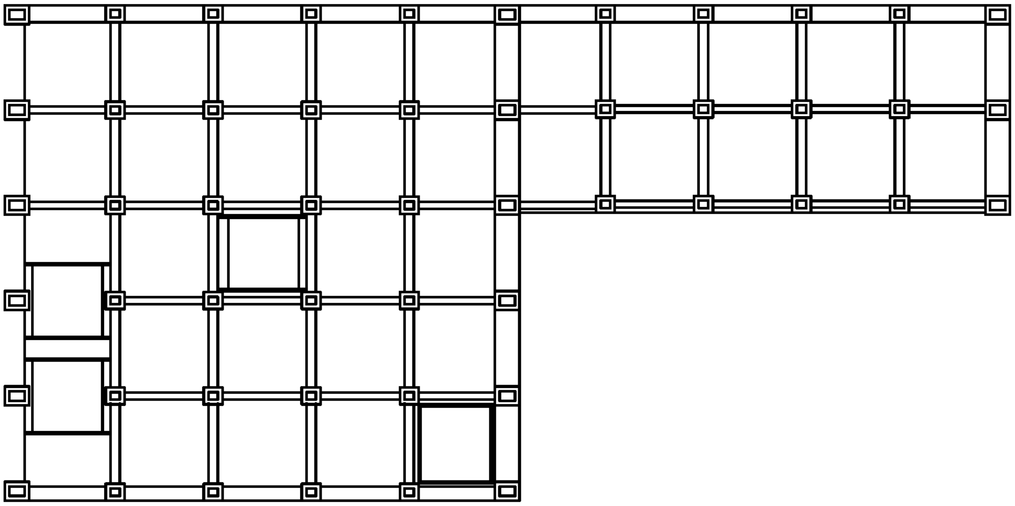
FIG. 10 is a top view of an alternate ASRS.
Figure 11:
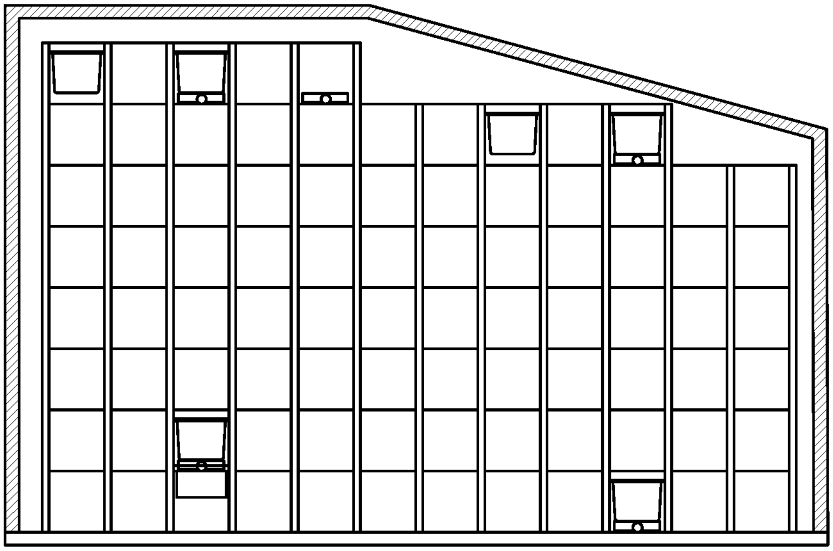
FIG. 11 is a top view of a second alternate ASRS.

FIG. 10 shows one example of an ASRS with non-rectangular footprint to accommodate available space in a facility. FIG. 11 shows one example of an ASRS with levels of different footprints accommodating environmental structure within the facility such as an angled roof limiting available footprint of upper levels.

FIG. 1 also shows multiple available elevators with one external to the footprint of the frame 44 and array of locations 42 and one within. Alternatively, there might be a single elevator or all may be within the footprint or all may be without/aside the footprint. In the last case, all may be along one face of the ASRS or there may be one or more elevators on multiple faces/sides. Furthermore, the illustrated elevator within the array is dimensioned so as to remove only one storage location 42 per level per elevator from the ASRS. Alternative elevators may be larger.

In an example method of manufacture, the uprights may be formed by an initial metallic extrusion (e.g., of aluminum) process and cut to length for a given application. Floor-mounting features and carrier support-mounting features may be pre-formed (e.g., by drilling holes for bolting or by welding or brazing of bosses or the like). In the example these are all a single array of drilled holes in each of the four sides of the upright. Similarly, features for mounting the upright bases to the floor and features for attaching horizontal and/or diagonal bracing (not shown) may be pre-formed. For example, there may be metal brackets (not shown) that have a first portion along the floor and a second portion fastened to adjacent holes in the upright. The carrier supports 66 and floor supports 90 may be pre-formed such as by stamping or machining/bending of metal and may be installed in the field so as to minimize chance of damage and allow the uprights to be compactly shipped.

Individual floor segments (plates or tiles) 58 may be made via cutting from metal plate stock.

Depending upon implementation, at the perimeter of the footprint, special boundary/perimeter conditions may apply. For example, special carrier supports not having unused portions extending outward might be used. Alternatively, the same carrier supports may be used throughout and unused portions may protrude at the perimeter.

An alternative elevator configuration involves a non-self-driven platform slidingly supported and driven by an external motor. For example, a rectangular platform may be slidingly supported by four uprights at its corners and supported by a cable system driven by a fixed motor. In one example, cables are secured adjacent each of the four platform corners and are driven by a common (shared) motor. Other elevator configurations may have a car/box (e.g., suspended by a central cable at its top) instead of a mere platform.

Further variations may address accidents and failures. One area is AGV failure. An AGV may malfunction and need to be retrieved. Access to the AGV may be difficult if many stored carriers are in the way. A rescue AGV may be configured to retrieve such a malfunctioning AGV. The rescue AGV may be of sufficiently high weight and power to be able to drag the malfunctioning AGV. The rescue AGV may have a robotic hook or grasper for engaging a complementary feature on the malfunctioning AGV.

Further variations may integrate fire monitoring and suppression capabilities.

Further variations may integrate AGV-charging stations (e.g., one or more locations per level having charging contacts or inductive charging pads).

For automated control over the ASRS, the system has one or more controllers. FIG. 1 shows, for purposes of illustration, a first control console-type station 800 accessible by a human user 802 and including one or more displays 804 (e.g., flat panel displays, indicator light arrays, and the like) and one or more user input devices (e.g., keyboards 806, pointing devices, switches, optical code scanners 808, and the like). The example station serves as a "goods to/from person station" where the user introduces goods to the ASRS or retrieves goods from the ASRS. There may be multiple such stations.

Figure 9:
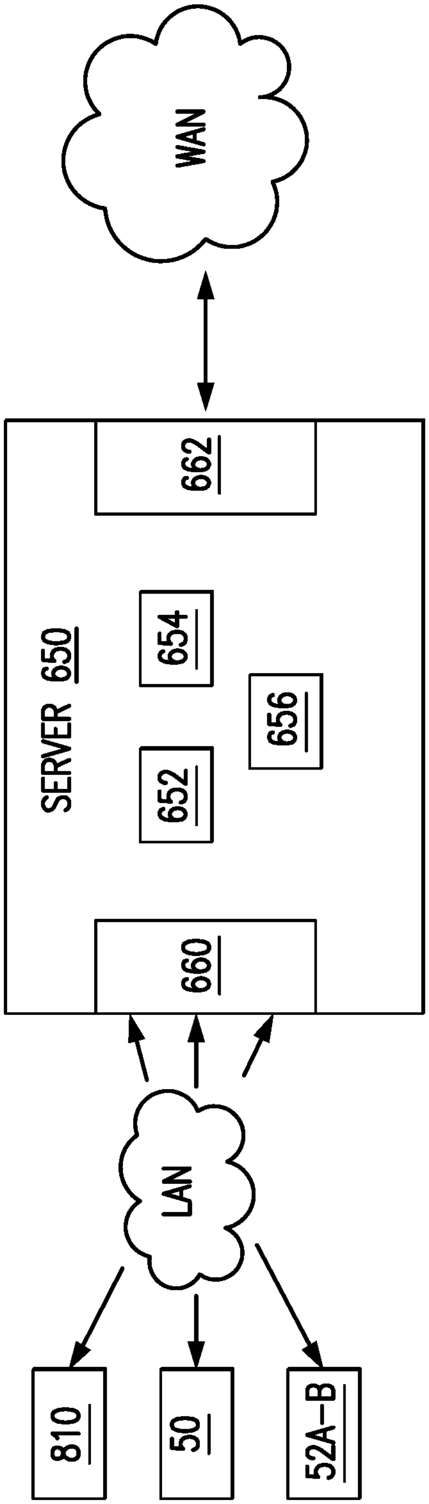
FIG. 9 is a schematic view of control hardware.

FIG. 9 shows a server 650 acting as an overall system controller and communicating, inter alia, with the AGVs, elevators, and goods to/from person stations, (e.g., via local area network (LAN) using one or more wired or wireless protocols). The server 650 further may communicate with an external environment via wide area network (WAN). The server 650 includes one or more processors 652, storage 654, and memory 656. The storage may contain the relevant programming and databases to be run via the processor and memory. The server 650 has interfaces for receiving power (not shown) and communications interfaces 660 and 662.

Figure 9A:
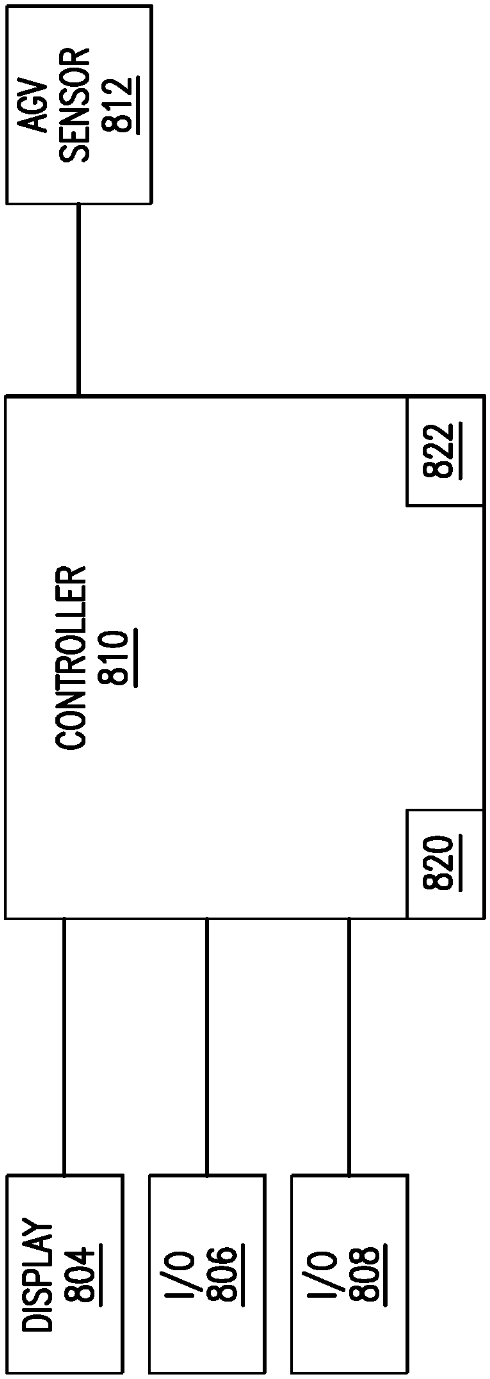
FIG. 9A is a schematic control hardware view of a goods to/from person station.

FIG. 9A schematically shows a goods to/from person station controller 810 (e.g., an industrial PC or a PLC). The controller 810 includes one or more processors, storage, and memory. The storage may contain the relevant programming to be run via the processor and memory. The controller 810 has interfaces for receiving power and communications interfaces. The controller 810 may communicate with various controlled system components, sensors, and the like via hardwired (e.g., ethernet) interfaces 820 and/or wireless (e.g., WiFi, Bluetooth, Zigbee, and the like) interfaces (radios) 822 and their radio links. It may also communicate with external systems including broader warehouse management or production management systems or distribution systems such as sales systems (not shown). FIG. 9A also shows the controller coupled to a vehicle-in-position sensor (e.g., a photoeye or a digital matrix code (DMC) sensor for detecting the generic presence of a vehicle or redundantly identifying a particular vehicle) 812 at a loading/unloading position 814 (FIG. 1).

Figure 12:
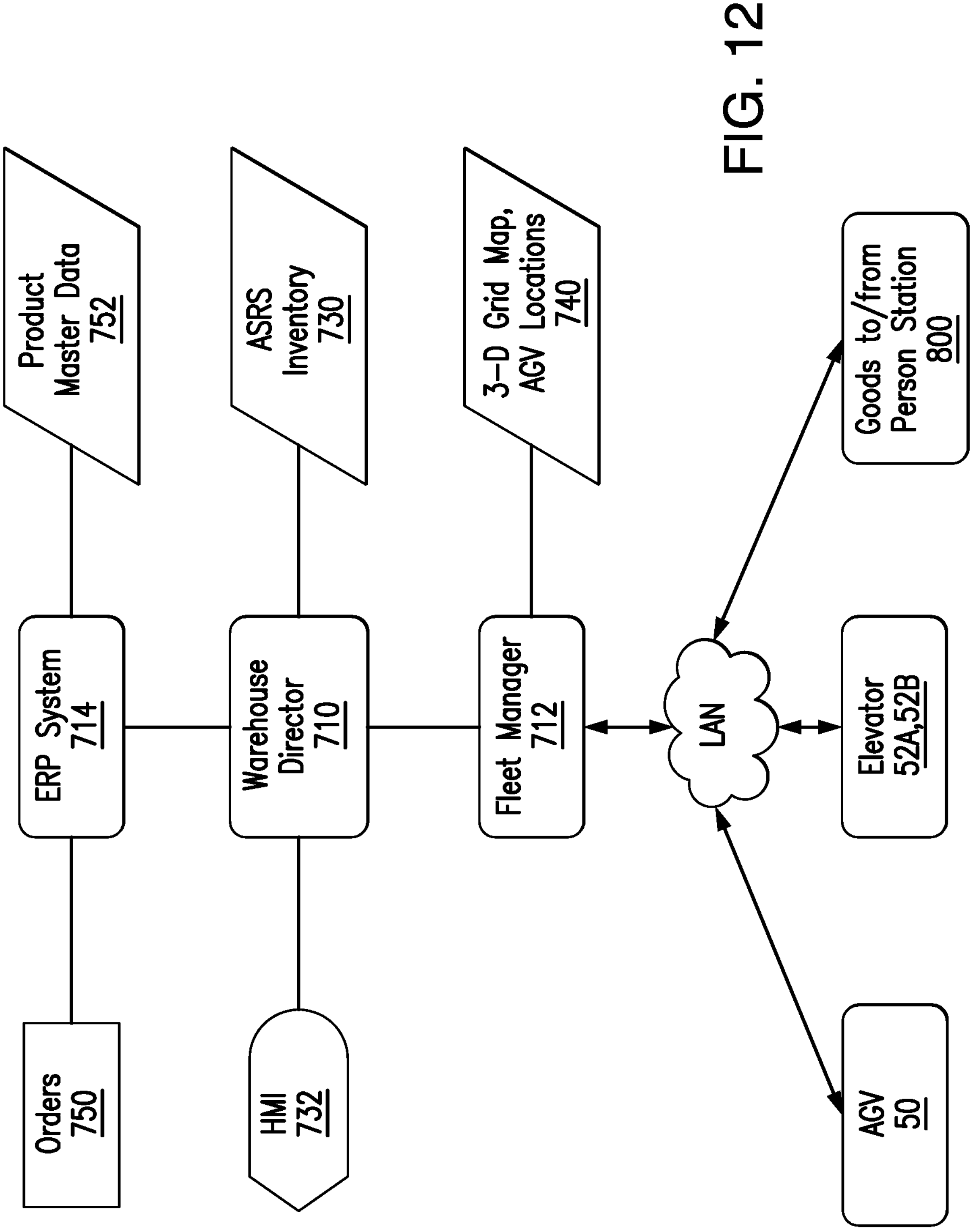
FIG. 12 is a software block diagram.

The server 650 may run software (FIG. 12) including a warehouse director 710, a fleet manager 712, and an enterprise resource planning (ERP) system 714.

The warehouse director 710 accesses databases including an ASRS inventory database 730. The ASRS inventory database contains fields of SKU data (including product information such as a photograph of the SKU, product specifications such as weight, individual product information such as expiration dates, and the like). The warehouse director makes algorithmic storage allocation decisions and keeps track of inventory. It further links to the ERP system to receive orders from the ERP system. It further communicates to the fleet manager to retrieve.

The fleet manager 712 accesses databases 740 including a 3-D grid map of the ASRS and its environment and an AGV location database. An example fleet manager may receive a command from the warehouse director to bring a specific carrier to a specific goods to person station. The fleet manager then decides based on the algorithms that are stored in it for routing and the like that as to what is the shortest or the quickest way to perform that task.

The fleet manager thus controls the vehicles and may also monitor the state of the vehicles. For example, the fleet manager may monitor charge of the vehicle so when the charge is below a certain threshold it brings the vehicle to a charging location. The charging location/hardware may also be controlled by the fleet manager.

The ERP system 714 may receive orders 750 from one or more other systems. The ERP system accesses databases 752 such as a product master database that may be similar to but broader than the ASRS inventory database. It may include in-transit and ordered items. It may include the ASR database. Many variations will depend on particular segregation or lack thereof of the different programs and functionalities.

More generically, the databases stored in and used by the system controller 650 may include fields for individually identifying the locations 42, the AGV 50, the carriers 30, the individual items of goods 32. The databases allow the controller 650 to associate individual goods 32 with individual carriers and individual carriers with the storage location in which they are stored or the AGV supporting them.

Additionally, various functionalities may, in particular implementations, be virtual or cloud-based. Additional local controllers (e.g., IPC or PLC) on controlled equipment such as the AGV and elevator(s) may have appropriate processors, memory, and storage to store and execute necessary programming.

Figure 9B:
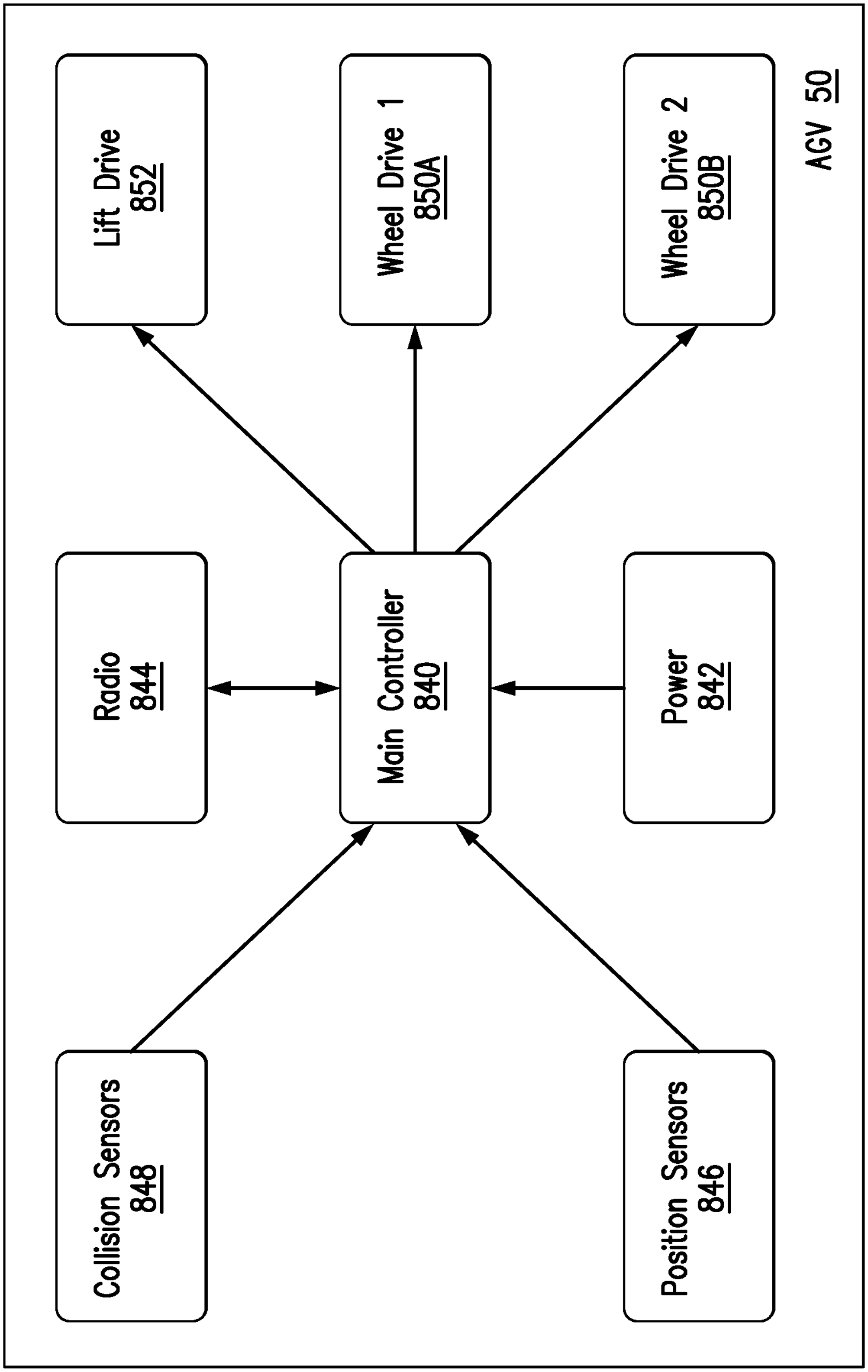
FIG. 9B is a schematic control hardware view of an AGV.

AGV position sensing and navigation may be achieved by one or more of several technologies. FIG. 9B shows a main controller 840 on the AGV which may communicate with the various AGV components and environment. FIG. 9B shows the controller communicating with drives 850A and 850B of the respective motors 222A and 222B and a drive 852 of the lift actuator 206. The controller 840 interfaces with a radio 844 for wireless LAN communication with the system controller 650. The controller 840 also communicates with power electronics 842 which includes the battery, charging system, and the like.

In an example implementation, the controller 840 interfaces with a combination of collision avoidance sensors 848 and position determination sensors 846. Example collision avoidance sensors include LIDAR, ultrasonic sensors, and laser distance measuring sensors. The example position determination sensors include digital matrix code (DMC) sensors, LTE triangulation sensors, LIDAR sensors, and wire sensors. For example, with DMC, each tile 58 may be centrally marked with a code that is scanned by an optical sensor 846. The codes may be unique to the particular location in the ASRS. Similar codes may be placed at locations along pathways outside the ASRS.

Figure 9C:
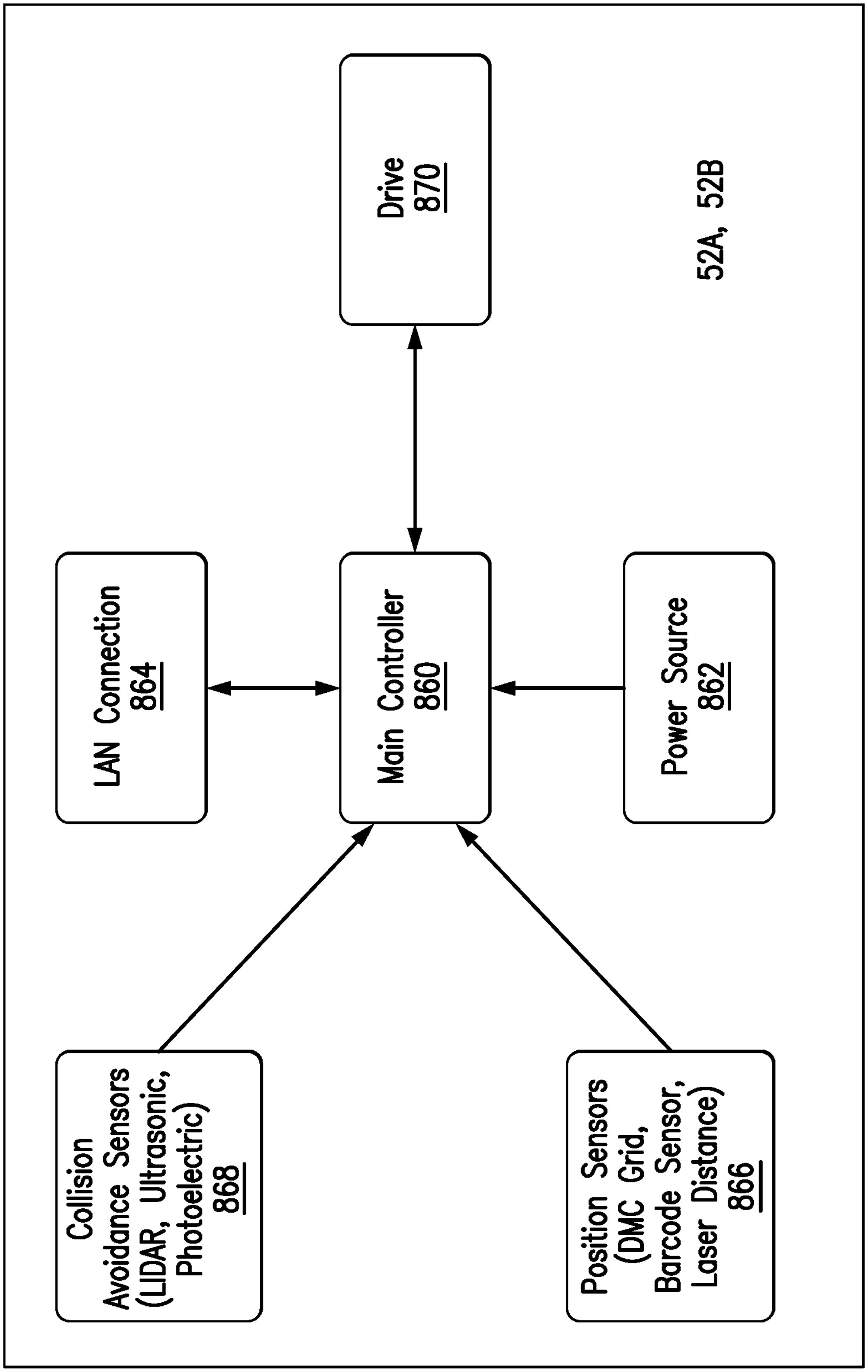
FIG. 9C is a schematic control hardware view of an elevator.

Elevator movement to levels determined by the controller 650 may be achieved by means such as encoder counts on the elevator motor, optionally as confirmed by a sensor such as a barcode sensor or digital matrix code (DMC) sensor. FIG. 9C shows a main controller 860 in one of the elevators (e.g., in the platform) and which may communicate with the various elevator components and environment. FIG. 9C shows the controller communicating with a drive 860 of the motor 156. The controller 860 interfaces with a radio 864 for wireless LAN communication with the system controller 650. The controller 860 also communicates with a power source 862 (e.g., on-platform battery or external power supply).

In an example implementation, the controller 860 interfaces with a combination of collision avoidance sensors 868 and position determination sensors 866. Example collision avoidance sensors include LIDAR, ultrasonic sensors, and photoelectric sensors. The example position determination sensors include digital matrix code (DMC) sensors, barcode sensors and laser distance sensors.

Figure 13:
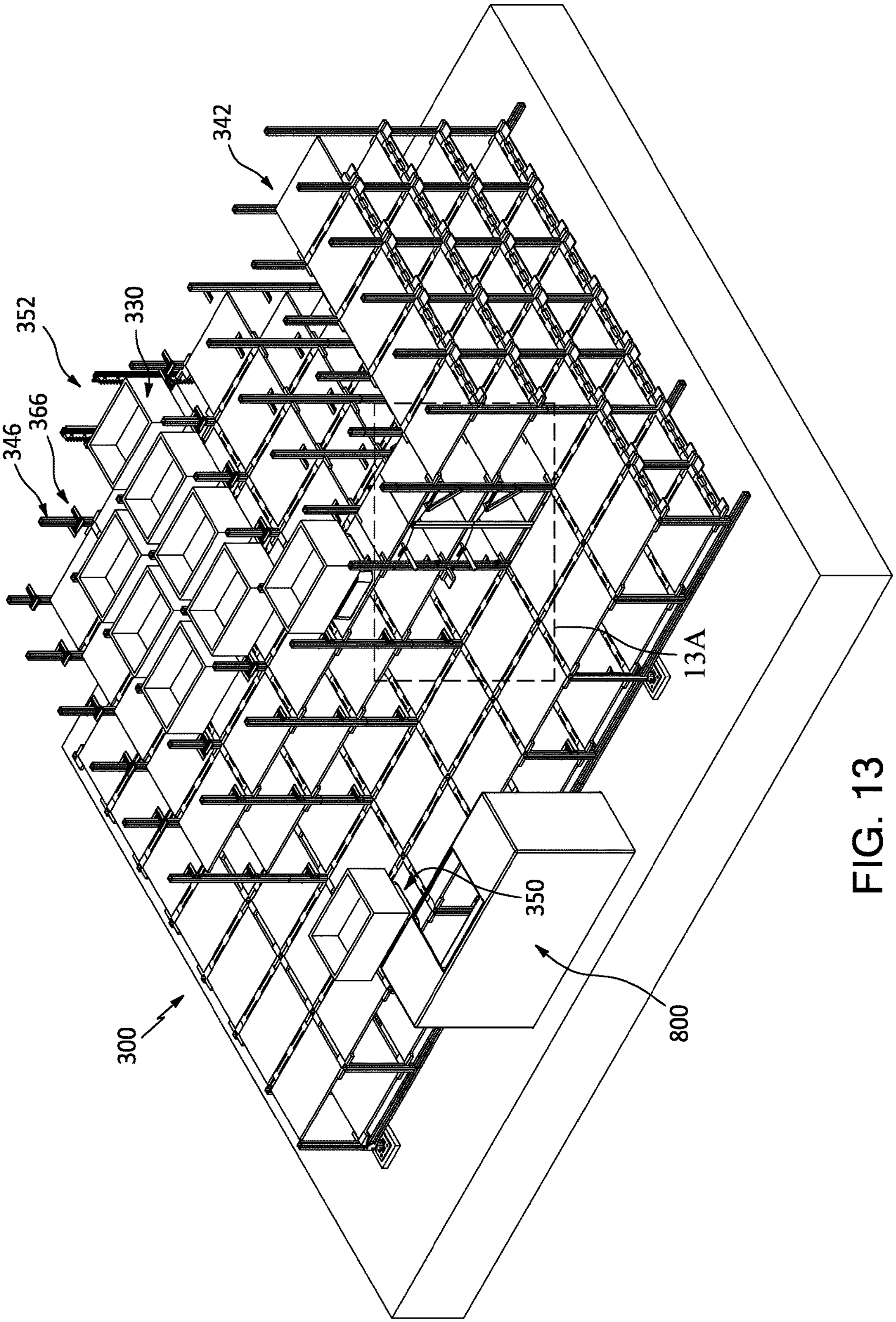
FIG. 13 is a first view of a third alternate ASRS with a bridge array lowered.

FIG. 13 shows an alternate ASRS 300 that may be otherwise similar to the system 20 of FIG. 1 in structure, manufacture, and use but may have one or more differences discussed below. The ASRS 300 in FIG. 13 and other views is shown cut away in various directions for purposes of illustration. Alternative embodiments may share any physically possible/practical combination of features shown or described for the various ASRS or their modifications. Thus various features that may be shared with the ASRS 20 are not shown (e.g., the goods to/from person station and other control and AGV or load positioning features, the interfaces with the building, and so forth). Also, for ease of reference only a single elevator system 352 is show which may be otherwise the same or similar to the systems 52A, 52B is shown whereas others may be present.

One difference is that the cell 342 footprint/planform is non-square rectangular. This is associated with the use of carriers 330 (e.g., bins/totes or pallets) that are non-square rectangular in footprint. Such non-square footprint bins/totes tend to be much more common than square footprint bins/totes. Thus, such a system may be particularly useful for a user that already has the non-square footprint bins/totes. An example non-square footprint/planform carrier has a longer dimension at least 110% of a smaller dimension (e.g., 110% to 200% or 120% to 150%). A corresponding cell eccentricity may be similar or slightly less (e.g., slightly less if there is addition of the same size gap in between carriers in adjacent cells both transverse dimensions/directions). The upright on-center spacing may also be similar (e.g., 110% to 200% or 120% to 150%) or slightly less. Nevertheless, less eccentric embodiments are included.

Figure 19:
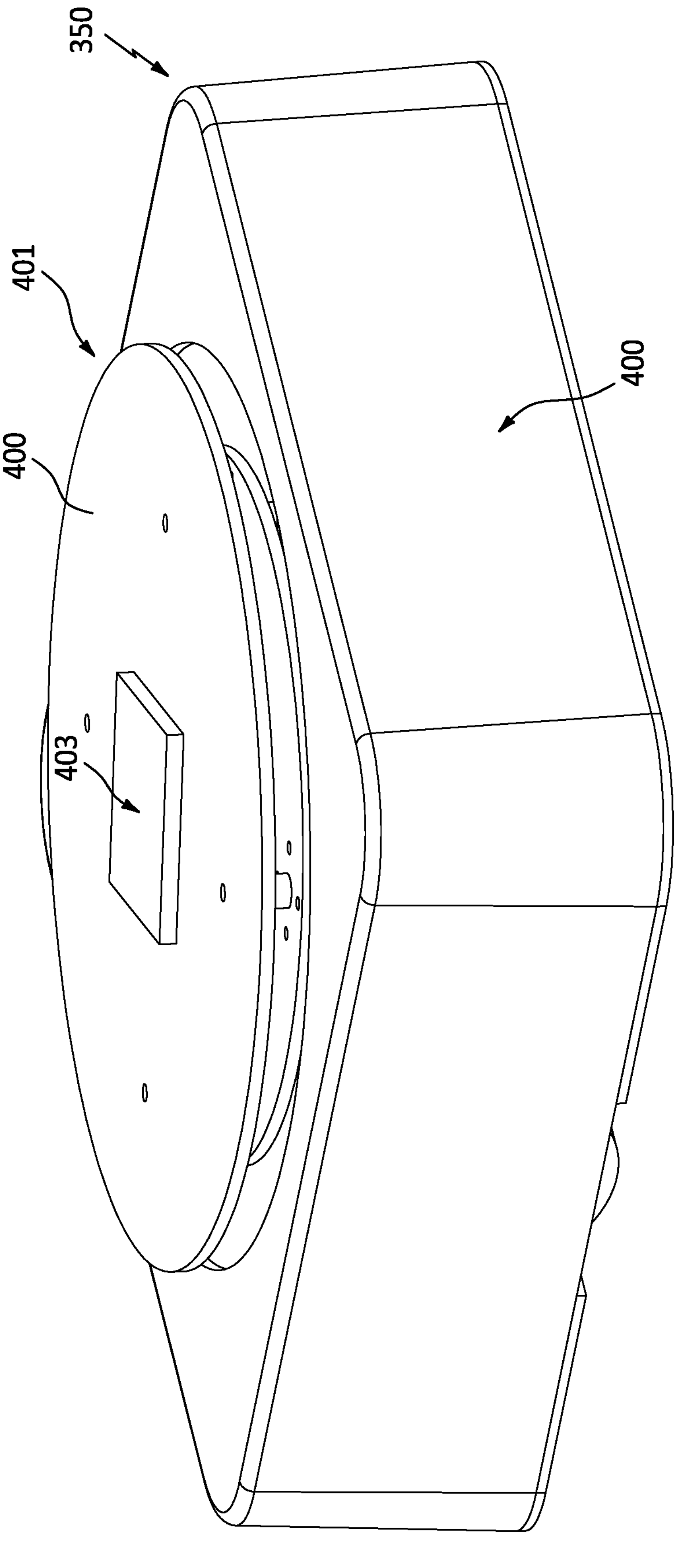
FIG. 19 is a view of a second AGV.
Figure 24:
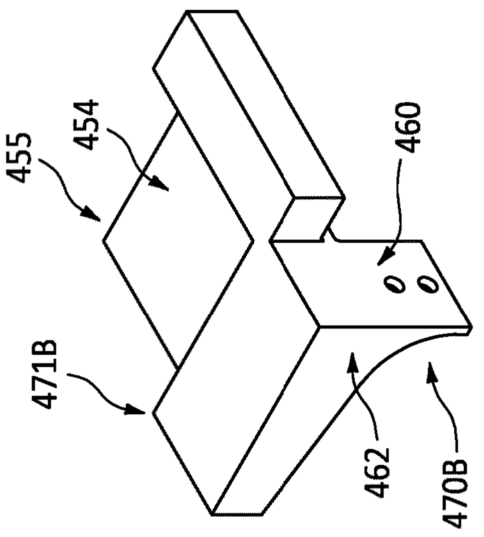
FIG. 24 is a view of a third floor tile support piece in the FIG. 13 ASRS.

A further, independent but potentially related, aspect is the AGV's 350 lifting surface 400 (FIG. 19) may be of a rotary platform (turntable) 401 (electric motor for driving such rotation not shown). Otherwise drive and lifting features may be similar to the AGV 50. Several manufacturers make such AGV. This facilitates a 90° turn by an AGV carrying a carrier. Relative to some alternative embodiments, this may avoid having to perform a multi-step turn (wherein the AGV must lower the carrier onto the supports and disengage the lifting surface from the carrier, turn 90 the AGV, and raise the lifting surface to engage and lift the carrier from the supports to proceed in the orthogonal direction).

Particularly when applied to square footprint carriers, it may be possible for an AGV to rotate while carrying a carrier that is sufficiently smaller than the footprint of the cell. However, this may be space-inefficient. Thus space-efficient, cell-filling, square carrier footprints would not be able to rotate. Whereas the small square footprint carrier may rotate 90° with the AGV, the eccentricity of a non-square footprint carrier may prevent such rotation due to interference with loads in adjacent calls or the uprights 346 (FIG. 13) in a corresponding non-square array.

Thus, while supporting a carrier 330, the AGV 350 may rotate 90° so as to change its direction of motion while relative counter-rotation of the platform preserves the orientation of the carrier relative to the cell. Thus, the elevated platform 401 counter-rotates relative to the remainder of the AGV chassis 404 during such AGV rotation/turning so as to maintain the platform and carrier orientation relative to the upright 346 array.

The example AGV 350 platform upper surface has a keying/registration/reference feature 403 (shown as a square planform projection) for interfitting with a complementary feature (e.g., a square footprint upward recess (not shown)) in the underside of the carrier base. Thus, if these features are mated, the carrier is in sufficiently precise angular registry with the platform so that the orientation of the carrier may be determined from the platform orientation which may be determined by an encoder or other device (not shown). The features prevent rotational slip to maintain the rotational registry/alignment of carrier and platform. Tapering, beveled or radiused edges of the features may guide an initial slight positional and/or rotational misalignment into a more precise alignment during platform raising into engagement with the carrier.

Another independent variation relative to the FIG. 1 embodiment involving the bins/totes 330 is that they are supported by the carrier supports 366 in the cells from the underside of their bottoms/bases rather than from the underside of an upper rim flange. Again, this may have advantages for users that already use bins/totes without flanges. Additionally, the absence of the protruding flange allows the bin/tote body to fill more of the cell footprint and is thus more space-efficient.

Figure 20:
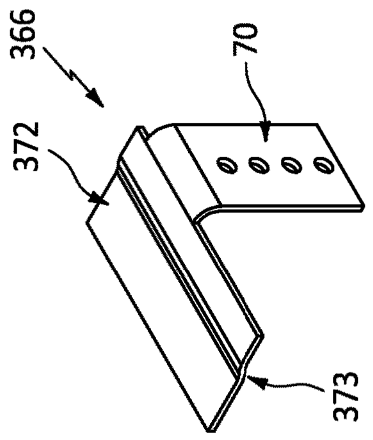
FIG. 20 is a view of a carrier support in the FIG. 13 ASRS.
Figure 23:
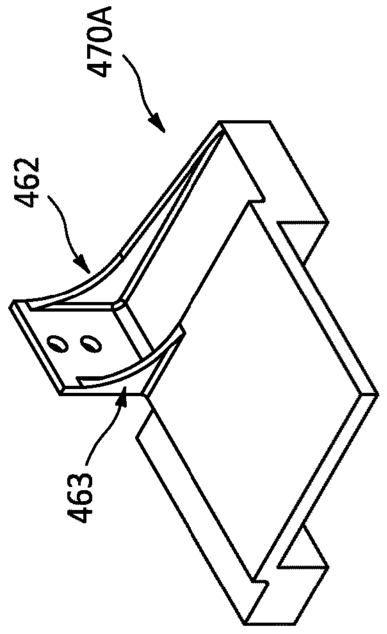
FIG. 23 is a second view of the second floor tile support piece in the FIG. 13 ASRS.

Another independent variation relative to the FIG. 1 embodiment is that the carrier supports 366 (otherwise similar to the supports 66) are configured to angle downward from the associated upright 346 to help center a supported carrier. The example carrier supports 366 (FIG. 20) flanges 372 taper downward in a stepped fashion with an angled portion 373 intervening between an essentially horizontally oriented proximal (near the upright) portion and an essentially horizontal distal portion that bears the weight of the contacted carrier.

Another independent variation relative to the FIG. 1 embodiment is that the floor tile supports have rebates receiving respective associated corner sections of the supported floor tile to help center/position such tile. The example floor tile supports may have a horizontally-extending portion (e.g., including the rebate in an upper surface) and a vertically-extending mounting portion.

Figure 21:
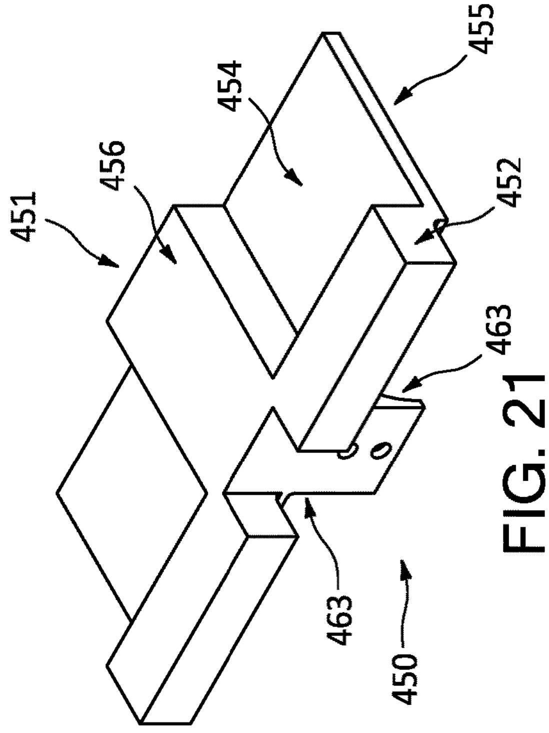
FIG. 21 is a view of a first floor tile support piece in the FIG. 13 ASRS.

Several different forms of such supports may coexist depending on how many adjacent cells with floor tiled there are. Thus, the example features a support piece 450 (FIG. 21) having a single full width principal structural/mounting portion 451 extending for essentially the full width of the upright to which it is mounted so as to accommodate the mounting holes. Ninety degrees to either side thereof are a pair of opposed narrow portions 452 with respective rebates 454 between the narrow portion 452 and principal structural/mounting portion 451. A base surface of the rebate 454 is formed by the upper surface of a generally square plate section 455 with the narrow portion 452 on one edge and an adjacent side of the upper section 456 of the principal structural/mounting portion 451. With a tile corner portion received in the rebate 454, the upper surface of the tile is flush with adjacent upper surfaces of the supper section 456 and narrow portion 452.

For example if there are a full four cells adjacent an upright, a two-component support may sandwich two such support pieces 450 around the upright with each piece having two of the rebates 454 (and the narrow portions 452 of the two pieces abutting). Just one of those support pieces could be used where there are just two cells to one side of an upright.

Figure 22:
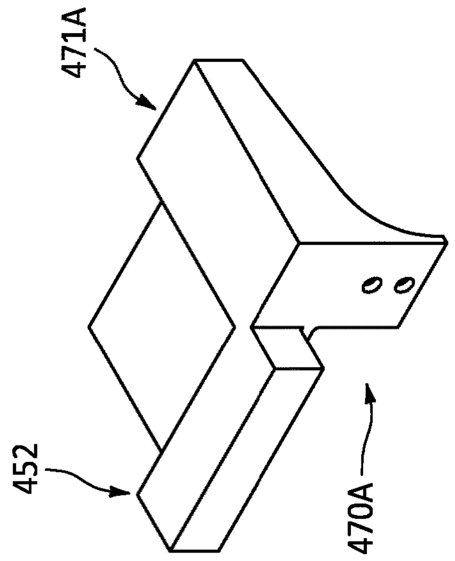
FIG. 22 is a view of a second floor tile support piece in the FIG. 13 ASRS.

The example also features two further support pieces 470A, 470B of opposite sense (FIGS. 22/23 and 24 respectively). Each of these has a principal structural/mounting portion 471A, 471B extending for essentially the full width of the upright to which it is mounted so as to accommodate the mounting holes. Ninety degrees therefrom is a narrower section 452 with the rebate 454 in between. Two of these opposite sense support pieces may be mounted on adjacent faces of an upright so that their narrow portions abut. If three cells, at a given location, one of these pieces 470A, 470B' may be added to the FIG. 21 piece 450. Mounting holes may be out of phase to those of the first piece to avoid bolt interference. Or with multiple mounting holes, less than all may be used to avoid such interference. The three illustrated pieces 450, 470A, 470B have their mounting portions/sections 460 (subportions/sections of portion/section 451) of plate-like form with a pair of lateral buttresses 462, 463 joining the horizontal portion. Yet other configurations are possible. These three example pieces may be cast (e.g., of aluminum alloy).

In the example configuration with rectangular (including square) floor tiles (plates), there will be inter-tile gaps of at least the width of the uprights. It may be desirable to span those gaps with structure providing a surface for the AGV wheels to ride across and/or a human to walk across. This may be done in several ways. For example, the tiles could be other than rectangular (e.g., having a stepped corner so that the central step is supported by the floor tile support and steps on other sides provide extension of the associated edge of the tile in between the two adjacent posts). This effectively creates a protrusion on each of the four sides (making the tile a blunt cruciform) so that the protruding portions of two adjacent tiles either contact or are sufficiently closely spaced to provide the desired properties.

Alternatively, the protrusions may be asymmetric. For example, each tile may have protrusions on two adjacent edges. Such protrusion may span into contact with or sufficient proximity to the non-protrusion edge of the adjacent tile.

Figure 16:
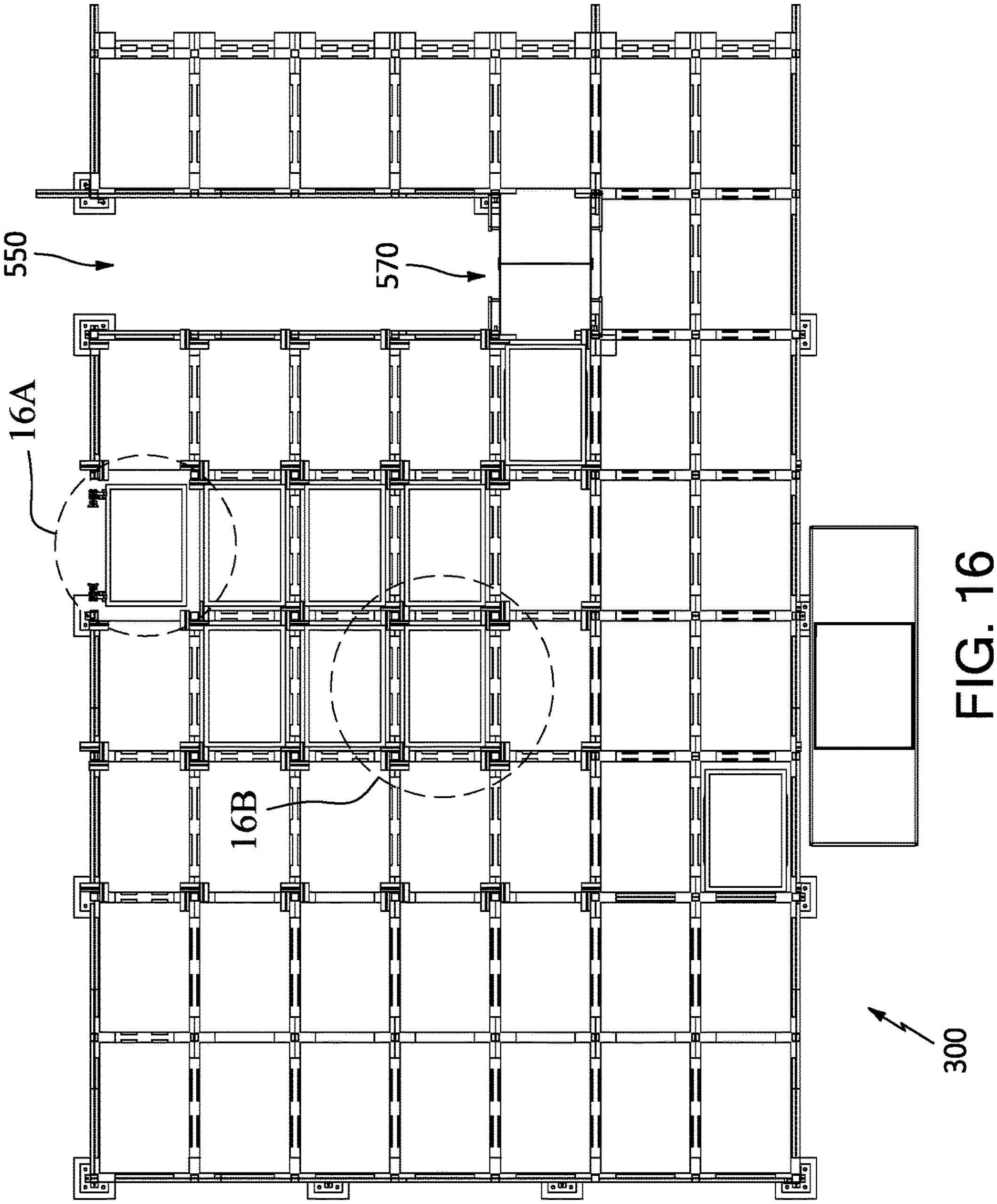
FIG. 16 is a top view of the FIG. 13 ASRS.
Figure 16A:
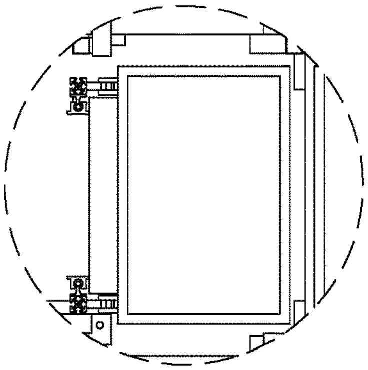
FIG. 16A is an enlarged view of the FIG. 16 ASRS.
Figure 16B:
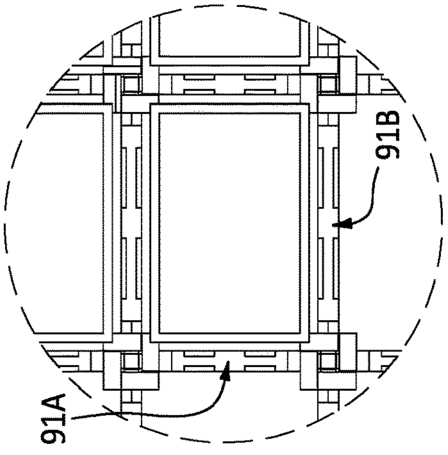
FIG. 16B is an enlarged view of the FIG. 16 ASRS.

Alternatively, even with rectangular footprint tiles, adapters may span gaps between tiles. Some adapters might be mounted to adjacent tile supports of adjacent uprights (e.g., via welding or bolting or release pins). Other adapters may be mounted to the tiles. For example, FIG. 16B shows adapters 91A (along the short edges of tiles) and 91B (along long edges). In one example, these adapters may be attached to one associated tile (e.g., via welding or fasteners). For example, they may be of a similar metal to the tile and may have a vertically recessed tab going under the adjacent tile edge portion and secured thereto so that the upper surfaces of the adapter and tile are coplanar. Thus, an adapter mounted to one tile spans the gap to an adapter-less edge of an adjacent tile. The example adapters have through-slots which may allow for passage of light, ventilation, and/or fire suppression agent to pass.

Figure 14:
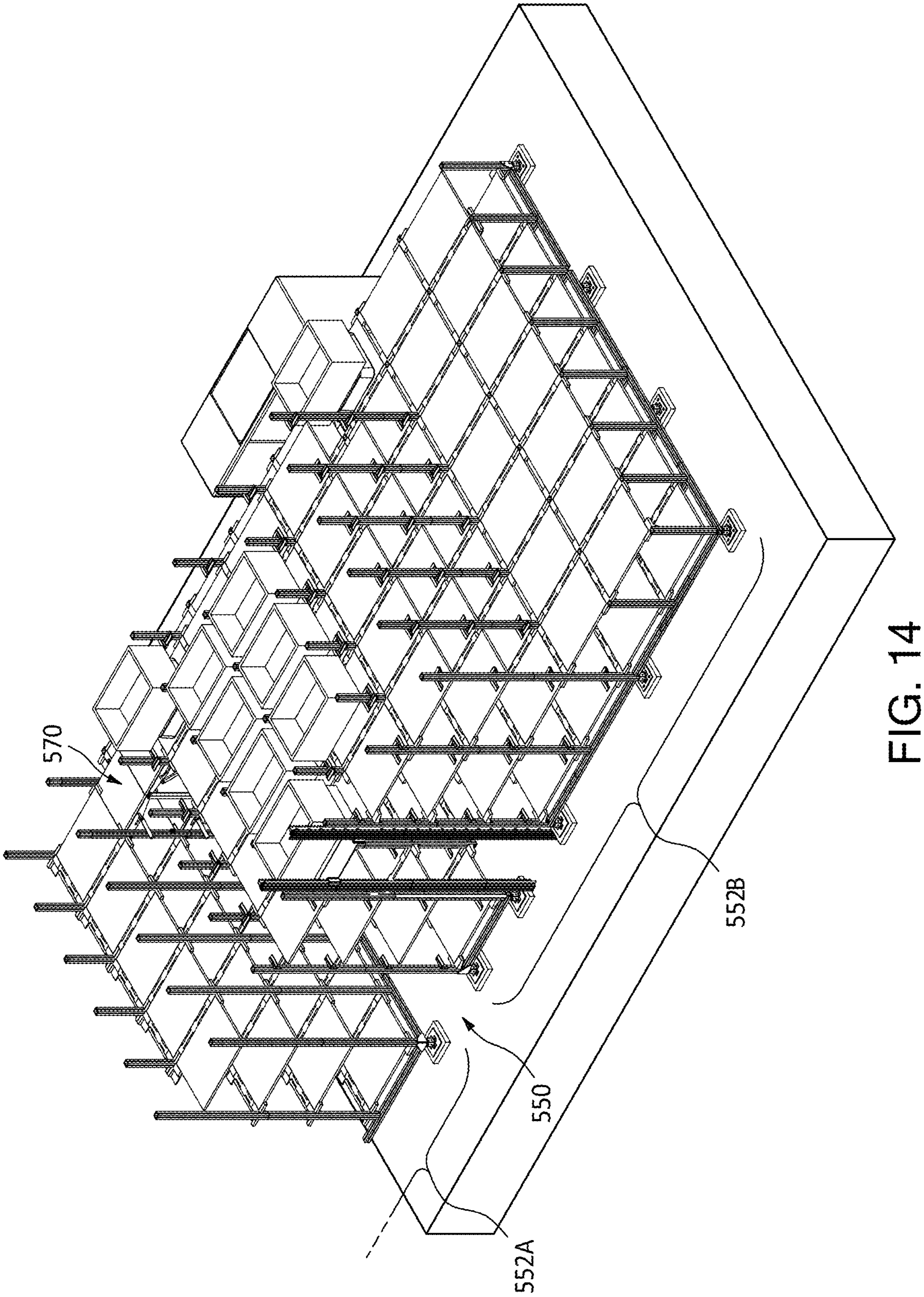
FIG. 14 is a second view of the FIG. 13 ASRS.

A further independent variation is that the rack 340 and its cells are at least partially divided by a cell-free zone (divide or gap) 550 (FIG. 14) extending inward from one edge of the array. The partial division may take any of several forms. In the example, the divide extends in from one edge of the array but does not extend all the way to the opposite edge. Instead, in the example, there are two rows of cells intact along the opposite edge. The intact cells join what amount to two banks 552A, 552B on opposite sides of the divide 550 to allow movement between banks. The divide allows user access between the two banks for various maintenance or service functions/activities. For example, if there is a spill of goods in one cell, the divide allows a user to get closer to that cell and perhaps access that cell via a tool (e.g., brush, mop, grasping tool, and the like).

Figure 15:
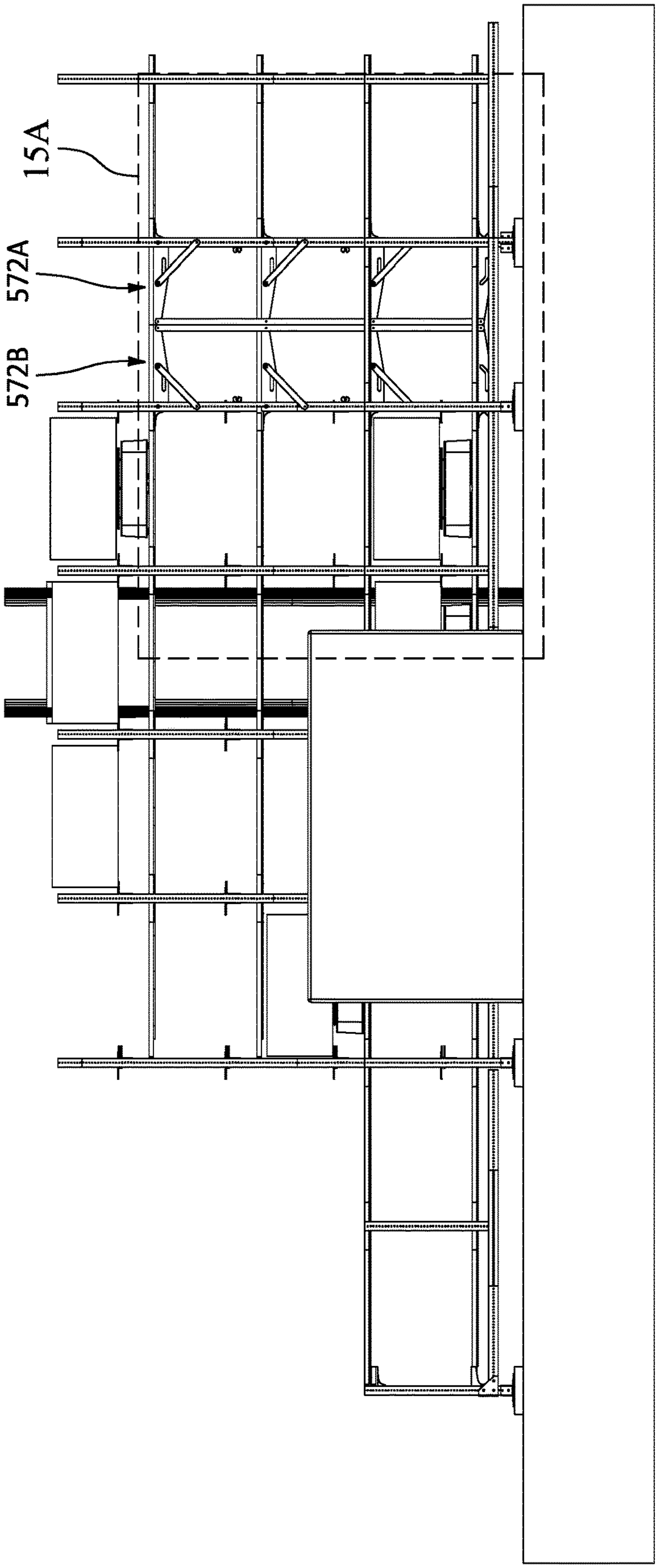
FIG. 15 is a front view of the FIG. 13 ASRS.
Figure 17:
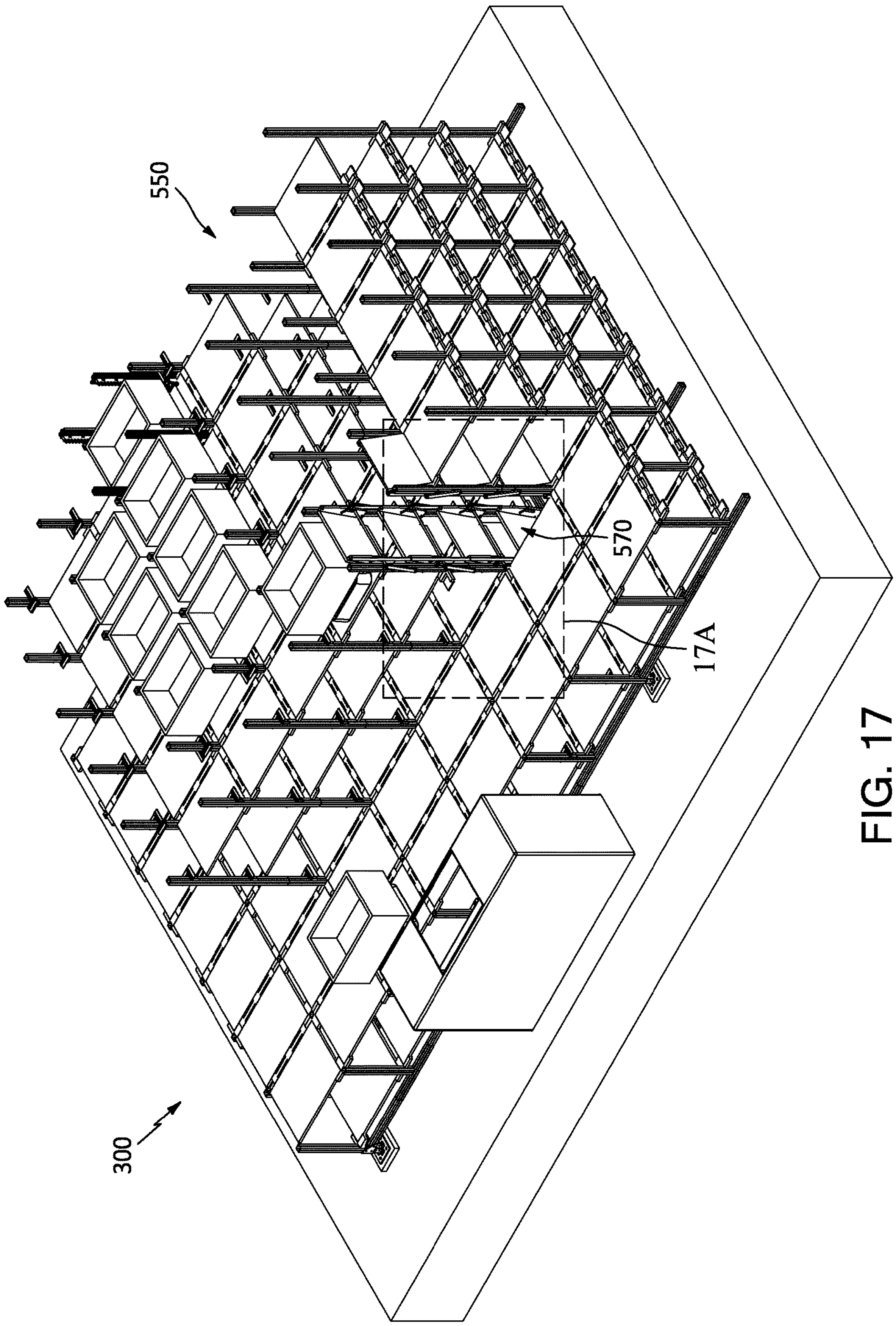
FIG. 17 is a first view of a third alternate ASRS with the bridge array raised.
Figure 17A:
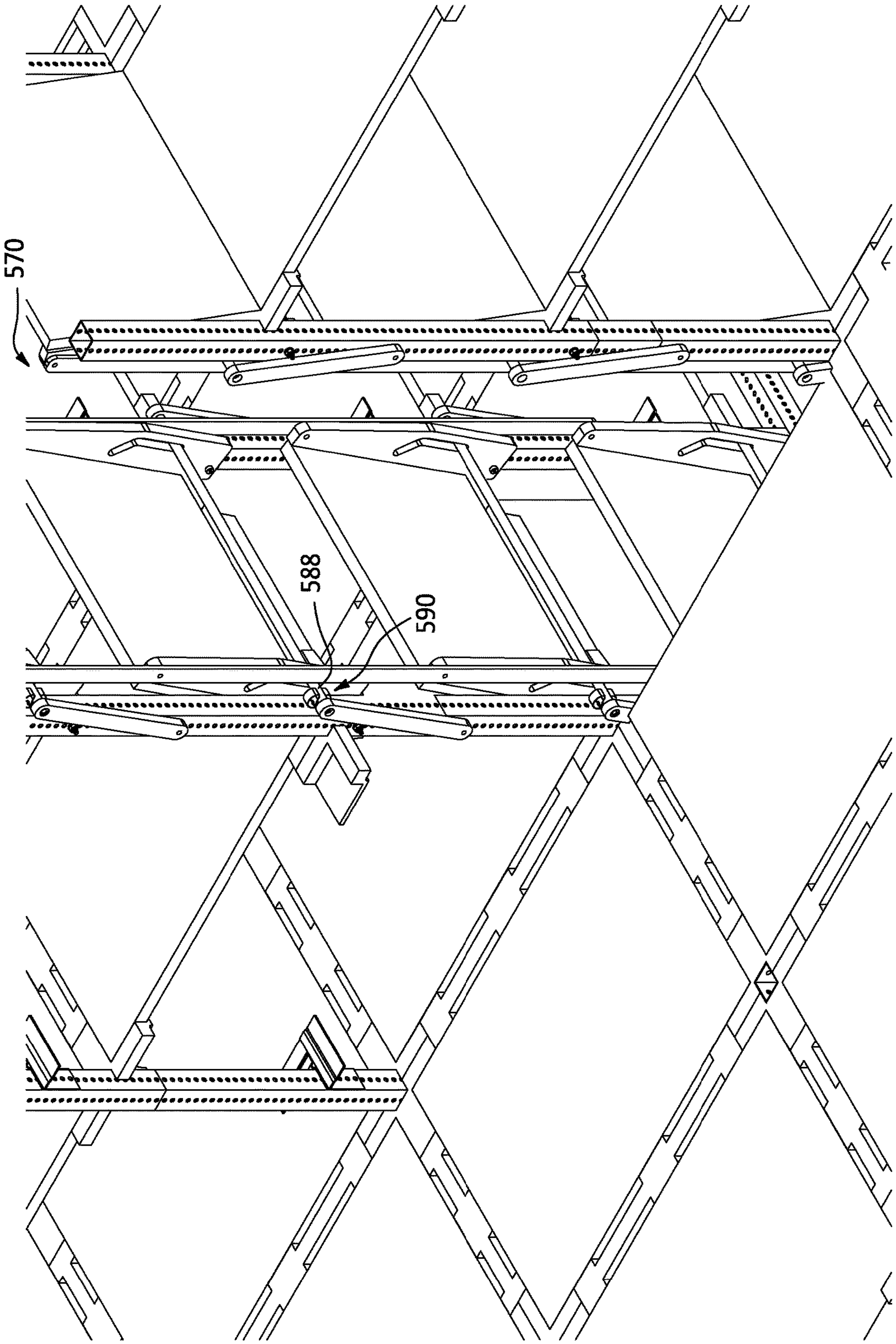
FIG. 17A is an enlarged view of the bridge array in the FIG. 17 ASRS.
Figure 18:
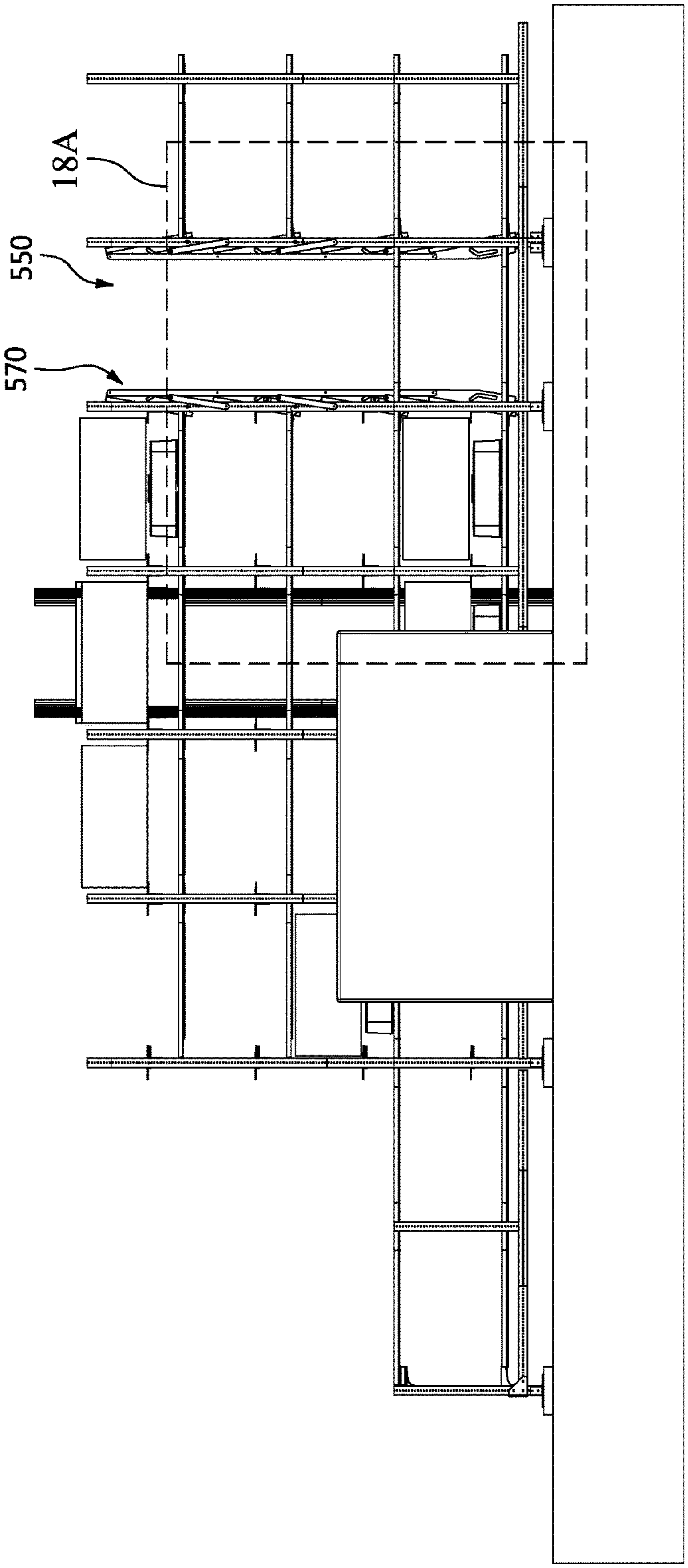
FIG. 18 is a front view of the FIG. 17 ASRS.
Figure 18A:
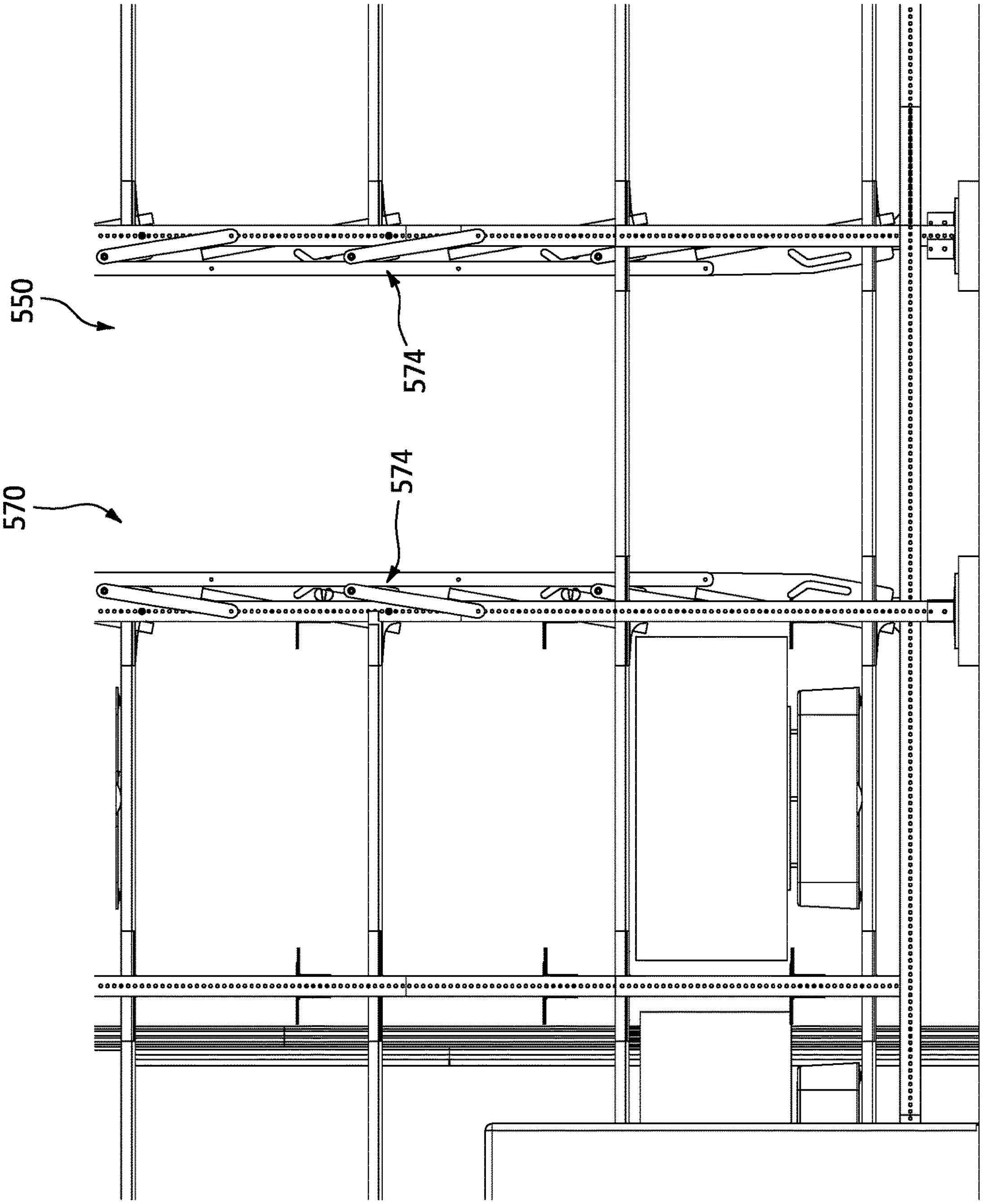
FIG. 18A is an enlarged view of the bridge array in the FIG. 18 ASRS.

For efficiency of operation, however, it may be desirable for AGVs to be able to cross the divide 550 at more than just the intact cells (if any). Thus, the example system has one or more bridges 570 straddling the divide but shiftable between a stowed condition in which the user can pass through the associated area of the divide and a deployed or unstowed condition wherein an AGV can traverse the divide on the bridge (e.g., while carrying a load). Each example bridge is of drawbridge-like construction with opposite hinged sections 572A, 572B (FIG. 15) hinged relative to the associated bank 552A, 552B for rotation between a raised stowed condition (FIG. 15) and a lowered deployed condition (FIG. 17).

Figure 13A:
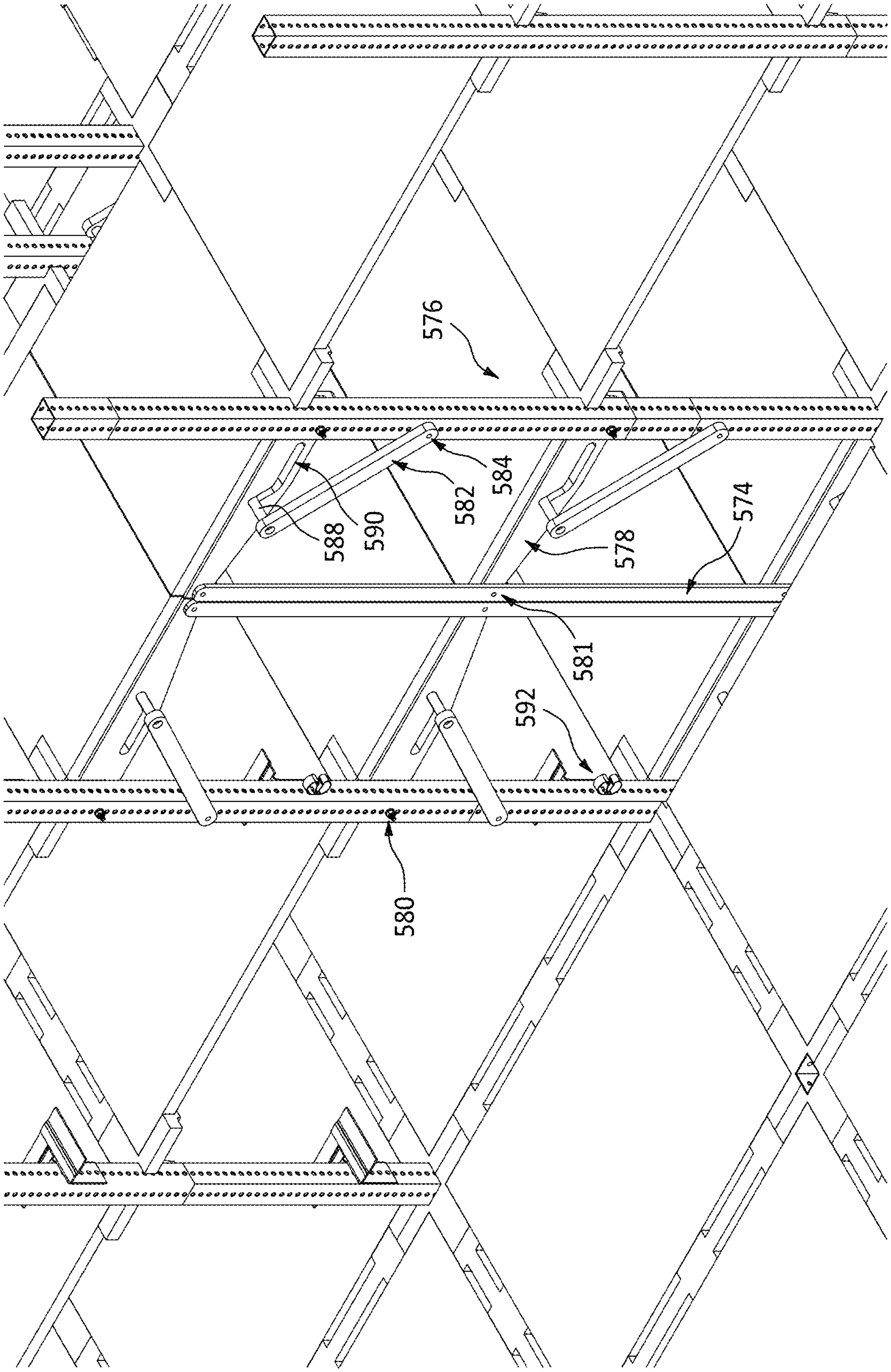
FIG. 13A is an enlarged view of the bridge array in the FIG. 13 ASRS.
Figure 15A:
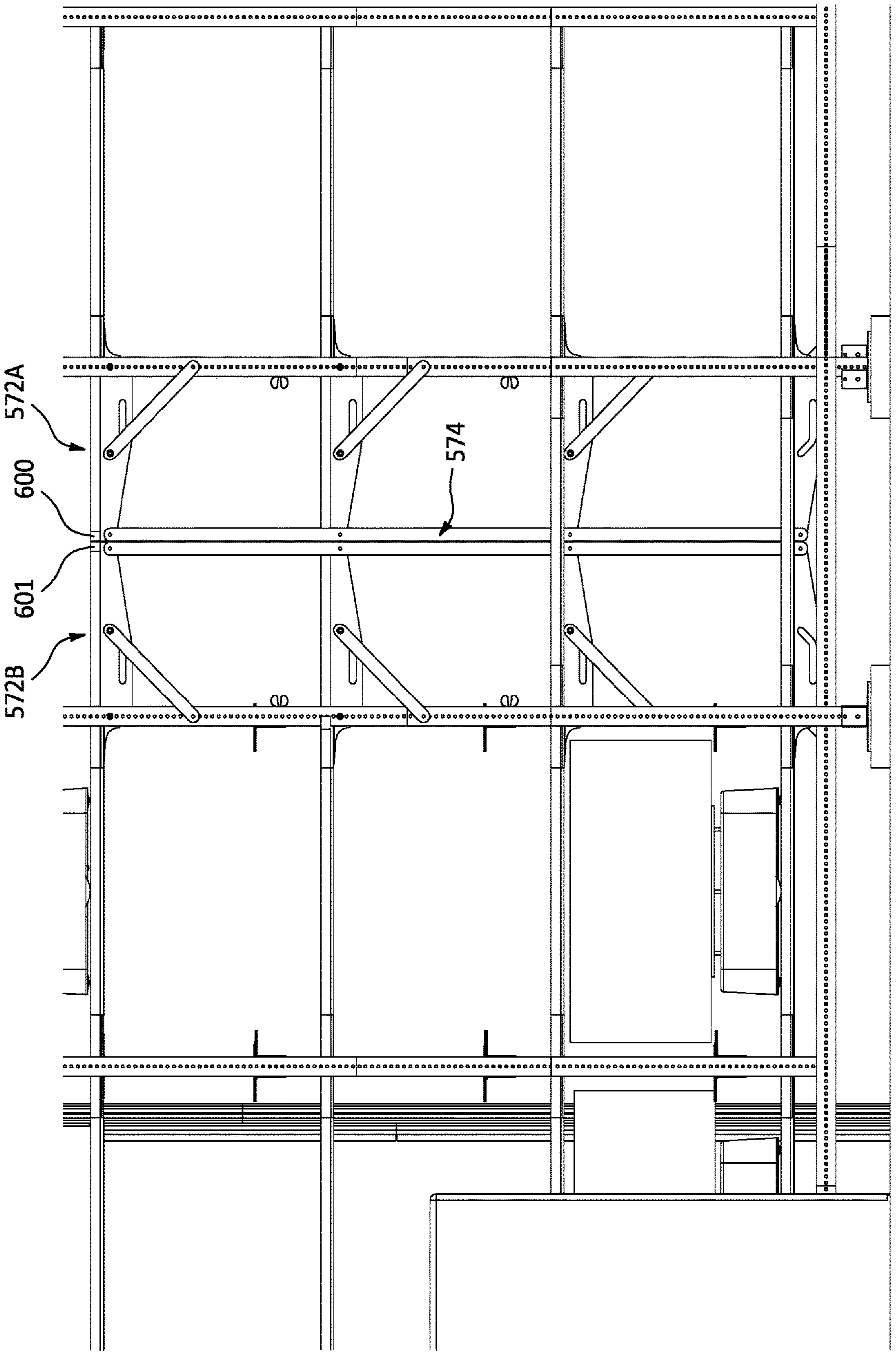
FIG. 15A is an enlarged view of the bridge array in the FIG. 15 ASRS.

The illustrated example involves bridges at each level one above another to form a vertical bridge array. Corresponding bridge first sections 572A of each bridge may be mechanically linked to synchronize their movement as may be the second sections 572B. The example linkage includes distal vertical posts 574 (FIG. 15A) that both provide support in the lowered deployed condition and synchronize the movement. Each post extends between a lower end and an upper end. Thus, a user may manually raise one of the posts 574 of one group of sections 572A or 572B raising all the associated bridge sections to the raised stowed condition. In the example, each of the bridge sections 572A and 572B may have a central platform portion 576 (FIG. 13A) and a pair of reinforcing side flanges 578 depending from the platform portion at opposite sides thereof. An example hinge axis is formed by respective fasteners (e.g., bolts) 580 extending through apertures in proximal portions of the flanges 578 and holes in the adjacent upright. Thus, each bridge section pivots about its associated bolts 580 and their shared axis. Similarly, each upright 574 may be pivotally connected to its associated bridge sections by pivots such as pivots 581 such as pins or other fasteners such as bolts for relative rotation about the axes of such pivots.

In the example embodiment, each platform has a pair of diagonal supports 582 extending from a proximal end pivotally connected to the associated upright at a pivot 584 to a distal end mounted to a shared shaft 588 so that one shaft of each bridge section has opposite ends mounted to (e.g., interference fit) the pair of supports 582. The shaft 588 passes through respective slots 590 in the side flanges 578. In the lowered condition, the shaft 588 abuts respective distal ends of the slots 590 to provide additional support for the platform, bearing platform loads under compression of the supports 582.

With raising of the platforms via user raising of one or both of the associated posts 574, the shaft 588 will follow the slot toward a proximal end of the slot. The raised stowed condition may be locked manually or detented via an over center or toggle action or a separate detent mechanism. In the example configuration, each bridge section has, along its associated pair of uprights, respective clips 592 (e.g., spring steel clips such as are used as wall-mount tool holders for gripping the handle of a tool such as hand tools, brooms, mops, and the like) which capture exposed portions of the shaft 588 as the bridges reach their raised condition. As the shaft encounters the spring clips, it drives the opposite jaws of the clips slightly open and then is received within the jaws with the jaws slightly relaxing to detentedly lock the raised condition. Sufficient downward force on the upright by the user will overcome the spring detenting of the clips, opening the jaws and extracting the shaft from the clips.

After raising one group of sections 572A or 572B, the user may then raise the associated other group of sections 572B or 572A to allow full width access through the divide.

Although the example linkage creates a fixed hinge action for each bridge section, alternative bridge sections may have floating-axis hinges. Lowering would be via reverse movement. Alternative to paired platforms, the bridge array may be a single vertical array of individual platforms spanning the gap in the deployed condition.

The example posts 574 have lower ends that are unsupported (e.g., do not directly contact a support surface such as a floor) in the lowered/deployed condition to vertically transfer a load which is borne via the bridge sections and their links 582. Thus, the posts link the bridge sections to transfer vertical loads between the bridge sections but do not otherwise provide vertical support. However, alternative embodiments may involve lower ends that contact a floor or other support surface to provide additional support for the deployed bridges.

Contact switches or other sensors may indicate condition. For example, one minimal situation involves proximity sensors 600 (schematically shown only in FIG. 15A). associated with the deployed condition that change state when the associated bridge section enters or leaves the deployed condition. Example sensors are magnetic, interfacing with a magnetic or ferromagnetic target 601. Example sensor and target mounting locations are on adjacent distal ends of adjacent bridge sections 572A and 572B (e.g., one sensor per vertical array of section pairs). For example, in a situation of a manual actuation of the bridge, the user lifts a bridge section 572A, 572B (or vertical array of such sections) and the switch 600 opens or closes. This sends a signal to the control system (server 650) indicating that the bridge (or vertical array of bridges) is not in service so that the control system will not route any AGV across that bridge. Once both sections 572A, 572B of a given bridge are reclosed, the control system may then route AGVs across such bridge. Alternative embodiments involve powered bridges (e.g., or example, where the user may press a button and a motor shifts the bridge (or array) between its two conditions).

In some examples, bridges are one or more different cell rows across the divide but not every row. However, in the example, the bridge(s) are at multiple levels, one above the other (e.g., at corresponding rows for each level). However, other variations are possible with more or fewer bridges and more or fewer bridge levels per bridge array. Additionally, other bridge structures are possible including potentially horizontally retractable bridges rather than hinged bridges or single section drawbridges. Additionally, in situations where carrier/cell size is sufficient to allow the divide to correspond to only a single row, there may still be supports along the adjacent uprights allowing a deployed bridge to be used as a storage cell.

Example bridge component are metallic (e.g., steel or aluminum alloys), and may be formed from various bar stock, strip stock, or sheet stock and cut, bent and/or welded to shape.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Also, the nature of the particular loads/goods and the nature of the particular facility may also influence particular implementations. Accordingly, other embodiments are within the scope of the following claims.

What is claimed is:

1. A storage system (20; 300) for storing loads (32) held by carriers (30; 330), the storage system comprising:
- a plurality of uprights (46; 346);
- a plurality of carrier supports (66; 366) mounted to the uprights;
- a plurality of flooring levels, one above another, supported by the plurality of uprights and forming a first bank (552A) and a second bank (552B) with a divide (550) between; and
- a plurality of bridges (570) having deployed conditions spanning the divide and stowed conditions not spanning the divide, wherein:
- the plurality of bridges are distributed in at least one vertical array; and
- for at least one said vertical array, the plurality of bridges are formed as hinged bridge platforms (576) with a linkage synchronizing movement between the deployed conditions and stowed conditions.

2. The storage system of claim 1 further comprising:
- a plurality of clips (592) for detentedly holding associated bridges in the stowed condition.

3. The storage system of claim 1 wherein:
- the at least one vertical array comprises at least one pair of vertical arrays of opposed pluralities of bridges for combining to span the divide in their deployed conditions.

4. The storage system of claim 1 further comprising:
- at least one wheeled automated vehicle, for carrying said carriers along the flooring levels and each comprising:
  - a chassis;
  - a pair of wheels rotatably mounted to the chassis;
  - at least one motor for driving the pair of wheels; and
  - a lifting surface for supporting a supported one of the carriers and shiftable between a lowered condition and a raised condition; and
- means for moving the at least one wheeled automated vehicle between the flooring levels.

5. The storage system of claim 1 wherein:
- the plurality of uprights are distributed as a rectangular grid.

6. The storage system of claim 1 wherein the plurality of uprights comprise:
- metallic extrusions, and wherein the carrier supports laterally protrude from the metallic extrusions so that the carrier supports of four of the uprights may support four corners of a stored one of the carriers.

7. The storage system of claim 1 further comprising:
- an elevator (52A, 52B) for moving the at least one wheeled automated vehicle between the flooring levels.

8. The storage system of claim 7 wherein the elevator comprises:
- a pair of vertically-extending toothed racks (124); and
- a motorized platform (120) having a pair of pinions (122) engaged to the toothed racks and driven by a motor (136) for vertical movement between the flooring levels.

9. The storage system of claim 1 wherein the plurality of carriers is a plurality of totes, each tote having:
- a base;
- opposite first and second sides extending from the base; and
- opposite second and third sides extending from the base.

10. The storage system of claim 9 wherein:
- the bases of the plurality of totes have a first feature; and
- the system includes at least one wheeled automated vehicle, for carrying said carriers along the flooring levels and each comprising:
  - a chassis;
  - a pair of wheels rotatably mounted to the chassis;
  - at least one motor for driving the pair of wheels; and
  - a lifting surface for supporting a supported one of the carriers and shiftable between a lowered condition and a raised condition; and
  - a second feature complementary to the first feature for rotationally registering a carried tote.

11. The storage system of claim 10 wherein:
- for each at least one wheeled automated vehicle, the lifting surface is rotatable relative to the chassis.

12. The storage system of claim 1 wherein:
- the linkage comprises a pair of vertical posts (574) pivotally connected to its associated bridge platforms.

13. The storage system of claim 12 wherein:
- the pair of posts have lower ends unsupported in the deployed condition.

14. The storage system of claim 12 wherein:
- each platform has a pair of side flanges (578);
- the linkage comprises, for each platform, a pair of diagonal supports (582);
- each diagonal support extends from a proximal end pivotally connected to the associated upright at a pivot (584) to a distal end mounted to a shaft (588) shared with the other diagonal support of the pair; and each shaft (588) passes through respective slots (590) in the side flanges (578), the slots each having a proximal end and a distal end.

15. The storage system of claim 14 wherein for a given said vertical array:

in the lowered condition, each shaft (588) abuts respective distal ends of the associated slots (590) to provide additional support for the platform, bearing platform loads under compression of the supports (582); and with raising of the platforms via a user raising of one or both of the associated posts the shaft will follow the slot toward the proximal end of the slot.

16. A method for using the storage system of claim 1, the method comprising:

a wheeled automated vehicle driving to a position below a stored carrier which stored carrier carries a load;

the wheeled automated vehicle raising a lifting surface from a lowered condition to contact an underside of the stored carrier and lift the stored carrier to a raised condition; and with the stored carrier in the raised condition moving the stored carrier.

17. The method of claim 16 wherein:

each of the storage locations has a plurality of support surfaces for supporting a stored carrier;

the carriers each have surfaces dimensioned to engage the support surfaces in the stored condition;

the lifting of the stored carrier disengages the carrier surfaces from the support surfaces; and during the moving, the carrier surfaces pass over the support surfaces of one or more others of said storage locations.

18. A method for using the storage system of claim 1, the method comprising:

shifting the plurality of bridges (570) between the deployed conditions and the stowed conditions, optionally manually, and optionally engaging or disengaging a switch or triggering or untriggering a sensor.

19. The method of claim 18 wherein:

the shifting comprises the linkage synchronizing movement between the deployed conditions and stowed conditions; and the method further comprises a wheeled automated vehicle driving across a deployed bridge.

20. The method of claim 18 wherein:

the engaging or disengaging a switch or triggering or untriggering a sensor occurs and causes a control system to route a wheeled automated vehicle driving around a stowed bridge.

21. The method of claim 18 wherein:

the shifting is to the stowed condition to detentedly hold associated bridges in the stowed condition.

* * * * *